(12) United States Patent
Moir et al.

(10) Patent No.: US 9,052,944 B2
(45) Date of Patent: Jun. 9, 2015

(54) OBSTRUCTION-FREE DATA STRUCTURES AND MECHANISMS WITH SEPARABLE AND/OR SUBSTITUTABLE CONTENTION MANAGEMENT MECHANISMS

(75) Inventors: Mark S. Moir, Hampton, NH (US); Victor M. Luchangco, Cambridge, MA (US); Maurice Herlihy, Cambridge (GB)

(73) Assignee: Oracle America, Inc., Redwood City, CA (US)

( * ) Notice: Subject to any disclaimer, the term of this patent is extended or adjusted under 35 U.S.C. 154(b) by 1860 days.

(21) Appl. No.: 11/106,790

(22) Filed: Apr. 15, 2005

(65) Prior Publication Data

US 2006/0173885 A1    Aug. 3, 2006

Related U.S. Application Data

(63) Continuation-in-part of application No. 10/621,072, filed on Jul. 16, 2003, now Pat. No. 7,328,316, and a (Continued)

(51) Int. Cl.
G06F 12/00    (2006.01)
G06F 13/00    (2006.01)
(Continued)

(52) U.S. Cl.
CPC ....................... G06F 9/466 (2013.01)

(58) Field of Classification Search
CPC ..................................................... G06F 9/466
USPC .......................................... 711/154; 707/101
See application file for complete search history.

(56) References Cited

U.S. PATENT DOCUMENTS 4,584,640 A    4/1986    MacGregor et al.
4,716,528 A *  12/1987   Crus et al. ..................... 710/200
(Continued)

FOREIGN PATENT DOCUMENTS

EP    0 366 585    5/1990
EP    0 466 339    1/1992

(Continued)

OTHER PUBLICATIONS

Afek, Yehuda, "Wait-Free Made Fast," Proc. 27th Annual ACM Symposium on the Theory of Computing, pp. 538-547, ACM Press, New York, NY 1995.

(Continued)

*Primary Examiner* — Sheng-Jen Tsai
(74) *Attorney, Agent, or Firm* — Robert C. Kowert; Meyertons, Hood, Kivlin, Kowert & Goetzel, P.C.

(57) ABSTRACT

We teach a powerful approach that greatly simplifies the design of non-blocking mechanisms and data structures, in part by, largely separate the issues of correctness and progress. At a high level, our methodology includes designing an "obstruction-free" implementation of the desired mechanism or data structure, which may then be combined with a contention management mechanism whose role is to facilitate the conditions under which progress of the obstruction-free implementation is assured. In general, the contention management mechanism is separable semantically from an obstruction-free concurrent shared/sharable object implementation to which it is/may be applied. In some cases, the contention management mechanism may actually be coded separately from the obstruction-free implementation. We elaborate herein on the notions of obstruction-freedom and contention management, and various possibilities for combining the two. In addition, we include description of some exemplary applications to particular concurrent software mechanisms and data structure implementations.

7 Claims, 10 Drawing Sheets

Related U.S. Application Data continuation-in-part of application No. 10/620,748, filed on Jul. 16, 2003, now Pat. No. 8,244,990, application No. 11/106,790, which is a continuation-in-part of application No. 10/620,747, filed on Jul. 16, 2003, now Pat. No. 7,685,583.

(60) Provisional application No. 60/396,152, filed on Jul. 16, 2002.

(51) Int. Cl.
*G06F 13/28* (2006.01)
*G06F 9/46* (2006.01)

(56) References Cited

U.S. PATENT DOCUMENTS

| | | | |
|---|---|---|---|
| 4,847,754 A | | 7/1989 | Obermarck et al. |
| 5,220,653 A | * | 6/1993 | Miro .............................. 718/107 |
| 5,224,215 A | | 6/1993 | Disbrow |
| 5,241,675 A | * | 8/1993 | Sheth et al. ........................... 1/1 |
| 5,319,778 A | | 6/1994 | Catino |
| 5,428,761 A | | 6/1995 | Herlihy et al. |
| 5,806,074 A | * | 9/1998 | Souder et al. ......................... 1/1 |
| 5,930,819 A | * | 7/1999 | Hetherington et al. ....... 711/131 |
| 6,128,710 A | | 10/2000 | Greenspan et al. |
| 6,144,965 A | | 11/2000 | Oliver |
| 6,178,423 B1 | | 1/2001 | Douceur et al. |
| 6,332,160 B1 | * | 12/2001 | Tabuchi ......................... 709/224 |
| 6,343,339 B1 | * | 1/2002 | Daynes ......................... 710/200 |
| 6,360,219 B1 | | 3/2002 | Bretl et al. |
| 6,360,220 B1 | | 3/2002 | Forin |
| 6,366,932 B1 | | 4/2002 | Christenson |
| 6,546,443 B1 | * | 4/2003 | Kakivaya et al. ............. 710/200 |
| 6,581,063 B1 | | 6/2003 | Kirkman |
| 6,651,146 B1 | * | 11/2003 | Srinivas et al. ............... 711/150 |
| 6,662,252 B1 | * | 12/2003 | Marshall et al. .............. 710/200 |
| 6,735,763 B1 | * | 5/2004 | Enokida ......................... 717/143 |
| 6,826,757 B2 | | 11/2004 | Steele, Jr. et al. |
| 6,944,642 B1 | * | 9/2005 | Hopmann et al. ............ 709/203 |
| 6,993,770 B1 | * | 1/2006 | Detlefs et al. ................. 719/315 |
| 2001/0047361 A1 | * | 11/2001 | Martin et al. ............. 707/103 R |
| 2003/0005229 A1 | * | 1/2003 | Rangan ......................... 711/122 |
| 2003/0140085 A1 | | 7/2003 | Moir et al. |
| 2003/0174572 A1 | | 9/2003 | Moir et al. |
| 2003/0177164 A1 | * | 9/2003 | Savov et al. ................... 709/104 |
| 2003/0182462 A1 | | 9/2003 | Moir et al. |
| 2003/0182465 A1 | | 9/2003 | Moir et al. |
| 2004/0015510 A1 | | 1/2004 | Moir et al. |
| 2004/0015642 A1 | | 1/2004 | Moir et al. |
| 2004/0034673 A1 | | 2/2004 | Moir et al. |
| 2004/0148472 A1 | * | 7/2004 | Barroso et al. ................ 711/141 |
| 2004/0153687 A1 | | 8/2004 | Moir et al. |
| 2006/0218561 A1 | * | 9/2006 | Moir et al. ..................... 719/316 |
| 2006/0242644 A1 | * | 10/2006 | Blue .............................. 718/100 |
| 2006/0248532 A1 | * | 11/2006 | Sachedina et al. ............ 718/102 |
| 2007/0186215 A1 | * | 8/2007 | Rajwar et al. ................. 718/102 |

FOREIGN PATENT DOCUMENTS

| | | |
|---|---|---|
| WO | WO 86/00434 | 1/1986 |
| WO | WO 01/53942 | 7/2001 |
| WO | WO 01/53943 | 7/2001 |
| WO | WO 01/80015 | 10/2001 |
| WO | WO 01/82057 | 11/2001 |
| WO | WO 03/060705 | 7/2003 |
| WO | WO 03/060715 | 7/2003 |

OTHER PUBLICATIONS

Anderson, James H. et al., "Universal Constructions for Large Objects," *IEEE Transactions on Parallel and Distributed Systems*, vol. 10, No. 12, pp. 1317-1332, 1999.

Herlihy, M., et al., "Transactional Memory: Architectural Support for Lock-Free Data Structures," *Proc. 20th International Symposium in Computer Architecture*, pp. 289-300, IEEE Computer Society, Washington, D.C., 1993.

Herlihy, Maurice, "Dynamic-Sized Lockfree Data Structures," Sun Microsystems Technical Report SMLI TR-2002-112, Jun. 2002.

Herlihy, Maurice et al., "The Repeat Offender Problem: A Mechanism for Supporting Dynamic-Sized Lock-Free Data Structures," Sun Microsystems Technical Report SMLI TR-2002-112, Jun. 2002.

Herlihy, Maurice et al., "Obstruction-Free Synchronization: Double-Ended Queues as an Example," *Proceedings of the 23rd International Conference on Distributed Computing*, p. 522, IEEE Computer Society, Washington, D.C., 2003.

Jones, Richard, et al., *Garbage Collection Algorithms for Automatic Dynamic Memory Management*, pp. 19-25, 200-202, John Wiley & Sons, Ltd. Chichester, England, 1996.

Mellor-Crummey, J., et al., Algorithms for Scalable Synchronization on Shared-Memory Multiprocessors, *ACM Transactions on Computer Systems*, vol. 9, No. 1, pp. 21-65, Feb. 1991.

Michael, Maged M. et al., "Safe Memory Reclamation for Dynamic Lock-Free Objects Using Atomic Reads and Writes," *Proceedings of the 21st Annual ACM Symposium on the Principles of Distributed Computing*, pp. 21-30, ACM Press, New York, NY, 2002.

Moir, Mark et al., "Wait-Free Algorithms for Fast, Long-Lived Renaming," *Science of Computer Programming*, vol. 25, No. 1, pp. 1-39; Aug. 1995.

Moir, Mark, "Practical implementation of non-blocking synchronization primitives," *Proceedings of the Sixteenth Annual ACM Symposium on Principles of Distributed Computing*, pp. 219-228, ACM Press, New York, NY, 1997.

Moir, Mark, "Transparent Support for Wait-Free Transactions," *Proceedings of the 11th International Workshop on Distributed Algorithms*, pp. 305-319, Springer-Verlag, London, UK, 1997.

Moir, Mark, "Laziness Pays! Using Lazy Synchronization Mechanisms to Improve Non-Blocking Constructions," *Proc. 19th Annual ACM Symposium on Principles of Distributed Computing*, pp. 61-70, ACM Press, New York, NY, 2000.

Goetz, Brian, "A First Look at JSR 166: Concurrency Utilities," Mar. 1, 2004. [URL: http://today.java.net/lpt/a/76].

Treiber, R., "Systems Programming: Coping with Parallelism," IBM Technical Report RJ5118, Apr. 23, 1986.

Turek, John et al., "Locking Without Blocking: Making Lock Based Concurrent Data Structure Algorithms Nonblocking," *Proceedings of the Eleventh ACM SIGACT-SIGMOD-SIGART Symposium on Principles of Database Systems*, pp. 212-222, ACM Press, New York, NY, 1992.

Herlihy, M.P., et al., "Linearizability: A Correctness Condition for Con-Current Objects," *ACM Transactions On Programming Languages and Systems*, 12(3):463-492, Jul. 1990.

Herlihy, M.P., "Wait-Free Synchronization," *ACM Transactions on Programming Languages and Systems*, 11(1):124-149, Jan. 1991.

Massalin, H., et al., "A Lock-Free Multiprocessor OS Kernel," Technical Report TR CUCS-005-9, Columbia University, New York, NY, 1991, 21 pages.

Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the Internet on Jul. 13, 2001: URL:ftp://ftp.cs.columbia.edu/reports/reports-1992/cucs-039-92.ps. gz].

Bershad, B. N., "Practical Considerations for Non-Blocking Concurrent Objects," *Proceedings 13th IEEE International Conference on Distributed Computing Systems*, pp. 264-273. IEEE Computer Society Press, Washington, D.C., 1993.

Herlihy, M., "A Methodology for Implementing Highly Concurrent Data Objects," *ACM Transactions on Programming Languages and Systems*, 15(5):745-770, Nov. 1993.

Attiya, Hagit, et al., "Are Wait-Free Algorithms Fast?" *Journal of the ACM*, 41(4):725-763, Jul. 1994.

(56) References Cited

OTHER PUBLICATIONS

LaMarca, A., "A performance evaluation of lock-free synchronization protocols," *Proceedings of the 13th Annual ACM Symposium on Principles of Distributed Computing*, pp. 130-140, ACM Press, New York, NY, 1994.

Michael, Maged M. et al., "Simple, Fast, and Practical Non-Blocking and Blocking Concurrent Queue Algorithms," Proceedings of PODC, pp. 267-275, May 1996.

Attiya, H., et al., "Universal Operations: Unary versus Binary," *Proceedings of the 15th Annual ACM Symposium on Principles of Distributed Computing*, pp. 223-232, ACM Press, New York, NY, 1996.

Greenwald, M. B., et al., "The Synergy Between Non-Blocking Synchronization and Operating System Structure," *Proceedings of the 2nd Symposium on Operating Systems Design and Implementation*, pp. 123-136, Usenix Association, Berkeley, CA, 1996.

Afek, Y., et al., "Disentangling Multi-Object Operations," *Proceedings of the 16th Annual ACM Symposium on Principles of Distributed Computing*, pp. 111-120, Aug. 1997. Santa Barbara, CA.

Arora, N. S., et al., "Thread Scheduling for Multiprogrammed Multiprocessors," *Proceedings of the 10th Annual ACM Symposium on Parallel Algorithms and Architectures*, pp. 119-129, ACM Press, New York, NY, 1998.

Attiya, Hagit, et al., "Atomic Snapshots in O(n log n) Operations," *SIAM Journal on Computing*, 27(2):319-340, Apr. 1998.

Greenwald, M., "Non-Blocking Synchronization and System Design," PhD thesis, Stanford University Technical Report STAN-CS-TR-99-1624, Palo Alto, CA, Aug. 1999, 241 pages.

Agesen, Ole, et al.: "DCAS-Based Concurrent Deques," *SPAA 2000. Proceedings of the 12th Annual ACM Symposium on Parallel Algorithms and Architectures*, pp. 137 146, ACM Press, New York, NY, ISBN: 1-58113-185-2, 2000.

Detlefs, David L., et al., "Even Better DCAS-Based Concurrent Deques," *Lecture Notes in Computer Science*, vol. 1914, pp. 59-73, Springer-Verlag, Berlin, Germany, ISBN: 3-540-41143-7, 2000.

U.S. Appl. No. 09/547,290, filed Apr. 11, 2000 and naming as inventor(s) Shavit et al.

U.S. Appl. No. 09/547,290, filed Apr. 11, 2000 and naming inventor(s) Shavit et al.

U.S. Appl. No. 09/710,218, filed Nov. 10, 2000 and naming as inventor(s) Harris, Timothy.

U.S. Appl. No. 09/837,671, filed Apr. 18, 2001 and naming as inventor(s) Detlefs et al.

\* cited by examiner

OBSTRUCTION-FREE DATA STRUCTURES AND MECHANISMS WITH SEPARABLE AND/OR SUBSTITUTABLE CONTENTION MANAGEMENT MECHANISMS

CROSS-REFERENCE TO RELATED APPLICATION(S)

This application is a continuation-in-part of commonly-owned, co-pending U.S. application Ser. No. 10/621,072, filed 16 Jul. 2003, entitled "SOFTWARE TRANSACTIONAL MEMORY FOR DYNAMICALLY SIZABLE SHARED DATA STRUCTURES" and naming Mark S. Moir, Victor M. Luchangco and Maurice Herlihy as inventors, which itself claims priority, under 35 U.S.C. §119(e), of U.S. Provisional Application No. 60/396,152, filed 16 Jul. 2002, naming Mark Moir, Victor Luchangco and Maurice Herlihy as inventors.

This application is also a continuation-in-part of commonly-owned, co-pending U.S. application Ser. No. 10/620,748, filed 16 Jul. 2003, entitled "OBSTRUCTION-FREE SYNCHRONIZATION FOR SHARED DATA STRUCTURES" and naming Mark S. Moir, Victor M. Luchangco and Maurice Herlihy as inventors, which itself claims priority, under 35 U.S.C. §119(e), of U.S. Provisional Application No. 60/396,152, filed 16 Jul. 2002, naming Mark Moir, Victor Luchangco and Maurice Herlihy as inventors.

This application is also a continuation-in-part of commonly-owned, co-pending U.S. application Ser. No. 10/620,747, filed 16 Jul. 2003, entitled "OBSTRUCTION-FREE MECHANISM FOR ATOMIC UPDATE OF MULTIPLE NON-CONTIGUOUS LOCATIONS IN SHARED MEMORY" and naming Mark S. Moir, Victor M. Luchangco and Maurice Herlihy as inventors, which itself claims priority, under 35 U.S.C. §119(e), of U.S. Provisional Application No. 60/396,152, filed 16 Jul. 2002, naming Mark Moir, Victor Luchangco and Maurice Herlihy as inventors.

U.S. application Ser. Nos. 10/621,072, 10/620,747 and 10/620,748 are incorporated herein by reference.

BACKGROUND

The present invention relates generally to coordination amongst execution sequences in a multiprocessor computer and to structures and techniques for facilitating non-blocking implementations of shared data structures. Non-blocking data structures and mechanisms are desirable because they overcome many of the common problems associated with the use of mutual exclusion (locks) for coordination between concurrent threads. To avoid these problems, such mechanisms and data structures typically must ensure that the delay or failure of some set of threads does not prevent progress by other threads.

Traditionally in the research literature, non-blocking data structures and mechanisms are also required to ensure progress by the participating threads, and the strength of this requirement has been formalized in properties such as wait-freedom and lock-freedom. As typically understood, wait-freedom requires that every thread makes progress in a finite number of its own steps, regardless of the timing behavior of other threads. Lock-freedom, a weaker condition, requires that after a finite number of steps of one thread, some thread has made progress. In the context of non-blocking data structures, "making progress" usually means completing an operation.

Designing algorithms that both behave correctly and ensure progress (according to progress conditions such as those mentioned above) for all interleavings of the threads' steps is very challenging. Ensuring progress often necessitates the use of complicated and computationally expensive "helping mechanisms," whereby a thread that potentially interferes with another thread's progress can subsequently "help" that thread to make progress. Largely as a result of this complication and expense, very few non-blocking mechanisms are actually deployed in practice. Therefore, as a practical matter, given the current state of the art, system and application designers must still use locks and must therefore deal with all of the problems associated with them.

Accordingly, alternative techniques are desired whereby at least some of the complexities and related computational expense of prior techniques may be avoided or reduced. In this way, non-blocking shared data objects may achieve wider adoption and use.

SUMMARY

We propose an alternative non-blocking condition, called obstruction-freedom, that we believe leads to simple, efficient non-blocking implementations of shared data structures and associated algorithms. A synchronization technique is obstruction-free if it guarantees progress for any thread that eventually executes in isolation. Even though other threads may be in the midst of executing operations, a thread is considered to execute in isolation as long as the other threads do not take any steps. Pragmatically, it is enough for the thread to run long enough without encountering a synchronization conflict from a concurrent thread. Like the wait-free and lock-free conditions, obstruction-free synchronization ensures that no thread can be blocked by delays or failures of other threads. However, this property is weaker than lock-free synchronization, because it does not guarantee progress when two or more conflicting threads are executing concurrently.

An unconventional aspect of our approach of implementing obstruction-free algorithms (which differs from the usual approach of implementing their lock-free and wait-free counterparts) is that we think that progress should be considered a problem of engineering, not of mathematics. We observe that conventional approaches, which tend to commingle correctness and progress, have typically resulted in unnecessarily inefficient and conceptually complex algorithms, creating a barrier to widespread acceptance of non-blocking forms of synchronization. Synchronization primitives provided by many modem processor architectures, such as compare-and-swap (CAS) operations or load-linked/store-conditional (LL/SC) operation pairs, are theoretically powerful enough (in the hands of a highly skilled programmer) to achieve wait-free (or lock-free) implementations of many linearizable data objects. Nevertheless, with a few exceptions, wait-free and lock-free data structures are rarely used in practice. We believe that a clean separation between the two concerns of correctness and progress promises simpler, more efficient, and more effective algorithms.

The description that follows teaches a powerful approach that greatly simplifies the design of non-blocking mechanisms and data structures. A central idea is to largely separate the issues of correctness and progress. At a high level, the methodology includes designing an "obstruction-free" implementation of the desired mechanism or data structure, which may then be combined with a contention management mechanism whose role is to facilitate the conditions under which progress of the obstruction-free implementation is assured. In general, the obstruction-free concurrent shared/sharable object implementation or mechanism is separable from the contention management mechanism is separable and semantics of the obstruction-free implementation or mechanism is independent of the contention management mechanism with which it is (or may be) combined. In some cases, the contention management mechanism may actually be coded separately from the obstruction-free implementation. We elaborate herein on the notions of obstruction-freedom and contention management, and various possibilities for combining the two. In addition, we include description of some exemplary applications to particular concurrent data structure implementations and/or concurrent software environments.

BRIEF DESCRIPTION OF THE DRAWINGS

The use of the same reference symbols in different drawings indicates similar or identical items.

DETAILED DESCRIPTION

Figure 1:
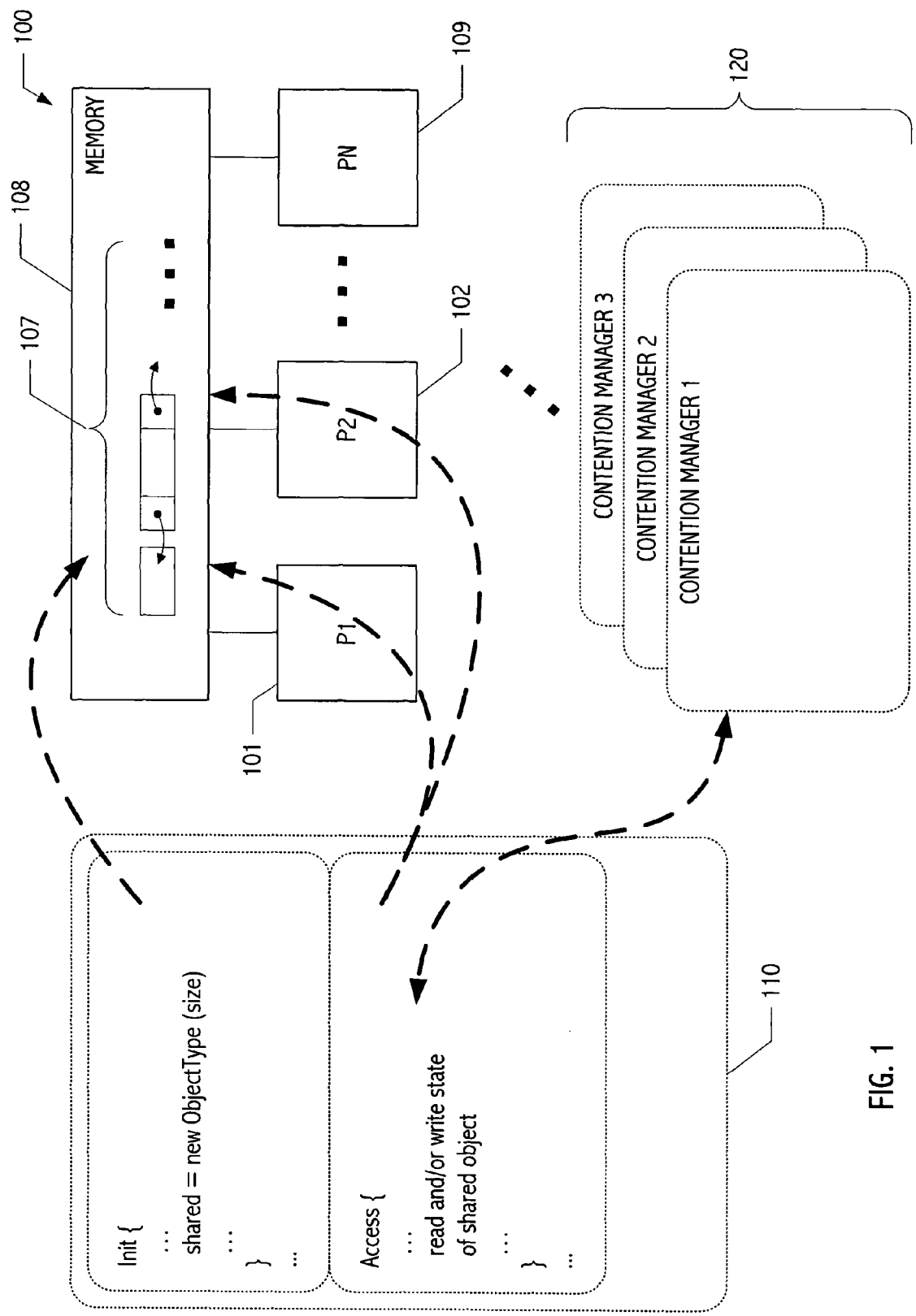
FIG. 1 depicts an exemplary multiprocessor on which techniques in accordance with present invention may be exploited.

A traditional way to implement shared data structures is to use mutual exclusion (locks) to ensure that concurrent operations do not interfere with one another. However, locking has a number of disadvantages with respect to software engineering, fault-tolerance, and scalability. As a result, researchers have investigated a variety of alternative non-blocking synchronization techniques that do not employ mutual exclusion.

A synchronization technique is said to be wait-free if it ensures that every thread will continue to make progress in the face of arbitrary delay (or even failure) of other threads. It is said to be lock-free if it ensures only that some thread always makes progress. While wait-free synchronization is the ideal behavior (thread starvation is unacceptable), lock-free synchronization is often good enough for practical purposes (as long as starvation, while possible in principle, never happens in practice).

In the hands of a highly skilled programmer, the synchronization primitives provided by many modern processor architectures, such as compare-and-swap (CAS) operations or load-linked/store-conditional (LL/SC) operation pairs, are typically powerful enough to achieve wait-free (or lock-free) implementations of a linearizable data object. Nevertheless, with a few exceptions, wait-free and lock-free data structures are rarely used in practice. The underlying problem is that conventional synchronization primitives such as CAS and LL/SC are an awkward match for lock-free synchronization. These primitives lend themselves most naturally to optimistic synchronization, which guarantees progress only in the absence of synchronization conflicts. For example, a natural way to use CAS for synchronization is to read a value v from an address a, perform a multistep computation to derive a new value w, and then to call CAS to reset the value of a from v to w. The CAS is successful if the value at a has not been changed in the meantime.

Designing algorithms that behave correctly and ensure progress (according to progress conditions such as those mentioned above) for all interleavings of the threads' steps is very challenging. Ensuring progress often necessitates the use of expensive and complicated "helping mechanisms," whereby a thread that potentially interferes with another thread's progress can subsequently "help" that thread to make progress. Largely as a result of this complication and expense, very few non-blocking mechanisms are deployed in practice. Therefore, in the current state of the art, system and application designers often still use locks and must therefore deal with all of the problems associated with them.

The techniques we describe herein provide, by way of example, a powerful approach that greatly simplifies the design of non-blocking mechanisms and data structures. An important aspect of our approach is to largely separate the issues of correctness and progress. At a high level, our methodology is to first design an "obstruction-free" implementation of the desired mechanism or data structure, and to then combine it with a contention management mechanism whose role is to facilitate the conditions under which the obstruction-free implementation guarantees progress. In this way, contention management can be separable, indeed modular and substitutable in some implementations.

We illustrate the use of our obstruction-free techniques in the context of three illustrative data structures or software mechanisms, namely the dynamic software transactional memory facility detailed in U.S. patent application Ser. No. 10/621,072, the obstruction-free double-ended queue (deque) implementation detailed in U.S. patent application Ser. No. 10/620,748, and the multiple-target transaction facilities and NCAS implementations detailed in U.S. patent application Ser. No. 10/620,747, each filed 16 Jul. 2003, and each naming Mark S. Moir, Victor M. Luchangco and Maurice Herlihy as inventors.

As a precursor to our detailed description of the three illustrative data structures or software mechanisms, we first elaborate (below) on the notions of obstruction-freedom and contention management, and various possibilities for combining the two.

Obstruction-Freedom

The only progress guarantee required of an obstruction-free implementation is that if, after some point, a thread t executes in isolation for a sufficient period of time, then t eventually makes progress. Mathematically, we can interpret "in isolation" as "while no other thread takes any steps." Pragmatically, provided no other thread modifies a variable that t reads, t's experience will be as if no other thread takes any steps. Thus, an obstruction-free implementation can often make progress, even when other threads are executing.

An obstruction-free implementation is often substantially easier to design than a corresponding lock-free or wait-free one exactly because there is no need to ensure that any thread makes progress in the case in which threads repeatedly interfere with each other. Thus, the complicated and expensive helping mechanisms often required for lock-free and wait-free implementations are not needed in obstruction-free implementations.

Of course, it is not acceptable in practice for no thread to make progress when threads interfere with each other. Therefore, avoiding such scenarios is the role of the second part of our approach: the contention management mechanism.

Below we discuss a variety of methods for implementing contention management mechanisms, and also a variety of methods for combining them with obstruction-free implementations to achieve implementations that are useful in practice.

Contention Management

At a high level, the role of the contention management mechanism is to attempt to produce the circumstances under which an obstruction-free implementation is guaranteed to make progress. That is, it attempts to control the timing of the steps of the underlying obstruction-free implementation in order to ensure that each thread eventually executes in isolation sufficiently long that it makes progress.

In a well-designed system, contention for a particular data structure or synchronization mechanism should usually be low. In this case, obstruction-free implementations will usually make progress naturally, without the help of the contention management mechanism. Thus, a good contention management mechanism should intervene to facilitate progress in the hopefully rare case in which contention is heavy, and should impose as little overhead as possible while contention is light.

Because the obstruction-free implementation is required to be correct in all interleavings, the contention management mechanism has complete freedom in controlling the timing of threads accessing the implementation. As a result, the design space of contention management mechanisms is very unconstrained, so it is possible to experiment with many alternatives, without concern that the correctness of the implementation is jeopardized. Indeed, it is even possible to change contention management mechanisms dynamically during the execution of the obstruction-free implementation without compromising correctness.

In contrast, because the "helping mechanisms" commonly used to guarantee progress in wait-free and lock-free implementations are intricately tied to the core implementation, these mechanisms cannot be easily substituted and experimented with, and generally cannot be changed during execution.

As stated above, a wide variety of possibilities exists for contention management mechanisms because they are free to control the timing of the underlying obstruction-free implementation in any way without jeopardizing correctness. Numerous contention management mechanisms have been explored in a variety of contexts. In general, a variety of contention management mechanisms may be employed in conjunction with a given obstruction-free software implementation and selection of a particular contention management mechanism may be based on a variety of design factors or preferences. Accordingly, we do not seek to specify a particular mechanism for any particular situation. Rather, we demonstrate a powerful approach to implementing non-blocking mechanisms by combining obstruction-free implementations with contention management mechanisms in general.

For completeness and clarity, however, we briefly mention several contention management mechanisms below.

Backoff—one mechanism for reducing contention is to "back off" (wait) for some time before trying again to make progress.

Priority—contention can be resolved by assigning priorities to threads, and ensuring that a thread (eventually) does not interfere with another thread of higher priority. Priorities can be assigned based on a variety of factors. For example, priority may be assigned based on a timestamp that indicates how long a thread has been trying to make progress.

Scheduling—in some cases, the scheduling environment naturally provides—or can be modified to provide—appropriate contention management. A simple example is in a quantum-scheduled uniprocessor. In such cases, the scheduler naturally provides each thread with a relatively long period of isolation. Similarly, in priority-scheduled real-time systems, scheduling analysis might be sufficient to show that progress is ensured.

Queuing—contention can be resolved by various queuing mechanisms, in which a thread waits for another to make progress before trying again. A number of variations are possible depending on the number of queues, how and when a thread decides whether to join a queue, and if so, which one.

To reap the benefits of non-blocking implementations, one must ensure that the contention management mechanism employed does not give rise to the same problems as locking does. For example, pure queuing and timestamp schemes allow the failure of one thread (at the head of the queue, or with the oldest timestamp) to prevent other threads from making progress. Thus, such schemes cannot be used naively. However, when using such mechanisms with obstruction-free implementations, it is usually easy to overcome these problems because the correctness of the implementation does not depend on strictly adhering to the contention management strategy. Thus, for example, we can typically add a "timeout" mechanism to any contention management mechanism, so that it retries or changes contention management strategy if too much time passes without making progress. In contrast, it is generally not permissible to revoke a lock from one thread and grant it to another. Thus, if a thread is delayed or fails permanently while holding a lock, other threads requiring that lock must wait, potentially forever.

Some contention management mechanisms are generally applicable, and easily combined with any obstruction-free implementation. For example, it is typically straightforward for a thread to detect that it is not making progress—usually because it is being forced to retry repeatedly. In such cases, the thread can decide to back off for some period of time. Various adaptive backoff schemes, such as random exponential backoff are well known and understood in other fields (e.g., network hardware and bus arbitration). These mechanisms are based on the idea that if threads repeatedly back off for increasing periods of time when they encounter contention, then eventually the threads will not interfere with each other, and therefore progress will be made.

Other contention management schemes rely more heavily on interaction between threads to determine which threads should wait before retrying, and for how long. Examples include timestamp- and queuing-based mechanisms.

Another possibility is to exploit knowledge of the underlying obstruction-free implementation. For example, sometimes a thread t can observe some part of the state of that implementation, and infer that some other thread t' is in the middle of an operation. Because the obstruction-free implementation is required to be correct in all interleavings, it is permissible for t to immediately continue execution. However, in many cases t' will soon make progress and if t does execute immediately, the next thing it will do is interfere with t', causing t' to retry. In such cases, it makes sense for t to simply wait briefly, to give t' a chance to make progress.

Examples of this technique are presented below in our descriptions of dynamic software transactional memory (DSTM) mechanisms and obstruction-free NCAS implementations. In the DSTM implementations described below, a transaction of thread t can detect that an active transaction of thread t' is accessing an object that a transaction of thread t wishes to access. Thread t can abort the transaction of thread t' and proceed with its own work, but it can also opt to wait for a short time in order to allow t' to make progress. Whether to wait and for how long to wait are policy decisions that do not affect correctness and can be made differently for different situations. Similarly, with respect to the obstruction-free NCAS implementations described below, threads executing our NCAS implementation can detect the presence of concurrent active operations, and can choose between aborting such operations, and waiting to give them a chance to complete.

Combining Contention Management with Obstruction-Free Implementations

There are many possibilities for combining obstruction-free implementations and mechanisms with contention management mechanisms. Here we discuss some of them. Based on the description herein, persons of ordinary skill in the art will appreciate suitable variations on, and alternatives to, the combinations specifically illustrated in the context of a particular illustrative mechanism or implementation.

One alternative is to code the contention management mechanism directly into the obstruction-free implementation, so that the code for contention management is executed inline with the code for the obstruction-free data structure or mechanism. While this approach is useful when we know which contention management mechanism we wish to use, it has several disadvantages. First, one of the advantages of our approach is that we need only design, verify, implement, and test the obstruction-free data structure or mechanism once, and we can then combine it with different contention management mechanisms for different execution environments, different application behaviors, etc. If the contention management code is "intermingled" with the obstruction-free implementation, then changing contention management mechanisms requires changes to the code of the obstruction-free implementation, which is inconvenient and risks compromising correctness. Furthermore, this approach tends to limit the possibility of changing contention management mechanisms dynamically in reaction to changing application conditions.

By providing an interface between the obstruction-free implementation and a generic contention management mechanism, we can much more easily use the same obstruction-free implementation with different contention management mechanisms. This is one approach we have taken in the Dynamic Software Transactional Memory implementation described below. The core transaction implementation notifies the contention management mechanism through an agreed interface of events such as transaction aborts, transaction commits, etc. The transaction implementation also consults the contention management mechanism whether to proceed or wait in certain circumstances, for example when attempting to access an object that is already being accessed by another active transaction. This approach allows programmers to design their own contention management mechanisms using our interface, and to simply "plug them in" without making changes to the core transaction implementation, which is intricate and subtle and therefore should not be changed simply to use a different contention management mechanism.

Another possibility is to use compiler support to incorporate a contention management mechanism into the obstruction-free implementation. This approach typically requires recompilation in order to change contention management mechanisms, but avoids the above-mentioned problems associated with modifying the obstruction-free implementation's source code to do so. Just-in-time compliers may include support for on-the-fly incorporation (and replacement) of a contention management mechanism.

It is also possible to exploit properties of the execution environment to facilitate progress, as opposed to executing additional code within the implementation. As mentioned above, one example is to exploit the fact that quantum-scheduled uniprocessors naturally run threads in isolation for relatively long periods of time, and for many obstruction-free implementations, this is sufficient to guarantee progress. Similarly, in priority-scheduled uniprocessor environments, scheduling analysis may be sufficient to determine that progress is guaranteed.

Another possibility for exploiting the execution environment is to use external mechanisms to control which threads can execute; in an extreme case we can allow only one thread to execute for some period of time, thereby ensuring progress to that thread. Most garbage collectors use mechanisms for stopping threads from executing while crucial garbage collection work is done. Modifying such systems to allow thread control for contention management is reasonably straightforward.

Finally, we have found that our approach of first designing an obstruction-free implementation, and then considering how to manage contention in order to facilitate progress has sometimes lead to implementations with stronger progress properties such as lock-freedom or wait-freedom. Because the obstruction-free implementation is often much easier than a corresponding lock-free or wait-free implementation, this approach allows us to understand the problem well enough to devise an obstruction-free implementation, where we might otherwise have failed to come up with any solution at all. Having achieved a correct implementation, it is sometimes possible to modify that implementation slightly in order to achieve the stronger progress property.

Processor Configurations, Threads and Interfaces

In general, a multiprocessor is a computer in which multiple processors are configured to execute cooperative threads of a computation, often communicating and coordinating through computational state represented in a shared-memory address space. A thread is an execution sequence (e.g., a program, processor or distinct thread or strand of execution thereof) that executes for a relevant period on a single one of the processors. Message-passing multiprocessor implementations are also well known, as are networks of processors and/or shared-memory multiprocessors (which together may exploit shared memory and/or message-passing communications). In general, the techniques that we describe may be exploited in any of a variety of multiprocessor configurations.

Some of our techniques are even applicable to uniprocessors in that the techniques facilitate production of a single source (or executable) representation of a data structure implementation or mechanism that can be compiled or otherwise prepared for execution (or executed) in both uniprocessor and multiprocessor environments. In such exploitations, an appropriate separate or separable contention manager for the uniprocessor execution may devolve to trivial contention management (e.g., none at all) if a scheduling quantum of the uniprocessor is sufficient (or may be made sufficient) to ensure that a given thread executes in isolation for a sufficient sequence of operations or period to ensure progress. By separating the issues of correctness and progress, our techniques allow the progress facilitating component of an implementation to be tailored to (or even provided by) each execution environment, while maintaining a concurrent shared object or mechanism implementation that is correct for a variety of execution environments.

While our techniques are not limited thereto, they will nonetheless be understood by persons of ordinary skill in the art in the context of a shared-memory multiprocessor. Accordingly, in view of the foregoing and without limitation, our description herein focuses on shared-memory multiprocessor exploitations as a useful descriptive context.

Turning then to FIG. 1, we depict an exemplary multiprocessor 100 including multiple processors 101, 102 . . . 109, and a memory 108 of which at least a portion is shared or sharable by two or more of the processors. A given program (e.g., threads of execution corresponding to illustrated pseudocode 110) may execute on multiprocessor 100 as plural cooperating threads. Similarly, a thread of execution corresponding to a first program may cooperate with a thread of execution corresponding to a second program. Threads typically manipulate data structures (e.g., data structure 107) that reside in memory (e.g., in one or more physical stores corresponding to memory 108). For simplicity of illustration, hierarchies of storage (e.g., levels of cache and memory) typical of modern processor architecture are not specifically illustrated. Memory 108 may comprise at least one computer readable medium selected from the set of a disk, tape or other magnetic, optical, or electronic storage medium. Memory 108 may include an encoding of a software mechanism, the encoding comprising one or more shared data structures 107, pseudocode 110, and/or one or more contention managers 120. A thread modifies or observes a shared data structure by executing a sequence of instructions. Often, there is a need to execute such a sequence atomically (or at least apparently so), so that the instructions are not interleaved with instructions of any other thread that is modifying or observing the same data structure.

In the context of FIG. 1, pseudocode 110 illustrates an obstruction-free concurrent shared/sharable object implementation or mechanism. One or more contention management mechanisms 120 are also illustrated. The contention management mechanisms facilitate progress of a computation that includes execution of obstruction-free access operations corresponding to pseudocode 110 on multiprocessor 100. In general, the obstruction-free concurrent shared/sharable object implementation or mechanism is separable from the contention management mechanism and the semantics of the obstruction-free implementation or mechanism is independent of the contention management mechanism with which it is combined. A functional encoding of the obstruction-free concurrent/sharable object implementation or mechanism, including a definition of a data structure instantiable in memory 107 and operations that, when executed on respective one or more processors that access memory 107, provide concurrent obstruction-free operations on the data structure, and a functional encoding of the contention management mechanism may be stored on a computer readable storage medium, such as a disk, tape or other magnetic, optical, or electronic storage medium.

In some of the implementations described herein, the contention management mechanism is coded separately from the obstruction-free implementation and coordination between the obstruction-free access operations and a current contention management mechanism is achieved by requests, communications, calls or invocations made according to a defined interface. In some exploitations, definition of such an interface facilitates runtime and/or execution environment specific selection of an appropriate contention management mechanism. In some exploitations, such an interface facilitates runtime changes in a contention management mechanism selection or strategy during the course of a computation that includes executions of the obstruction-free access operations.

Accordingly, building on these insights, we have developed several exemplary exploitations that will provide persons of ordinary skill in the art with a clearer understanding of the scope and breadth of our techniques. These exemplary exploitations include a dynamic software transactional memory mechanism, an obstruction-free concurrent shared/sharable object implementation of a double-ended queue (deque), and an obstruction-free mechanism for providing a multi-target compare-and-swap (NCAS). Each of these exploitations is described in turn. Of course, based on the description herein, persons of ordinary skill in the art will appreciate many other implementations and mechanisms that build upon the techniques we employ to combine obstruction-free data structures and/or mechanisms with one or more separable and/or substitutable contention management mechanisms. We first describe a dynamic software transactional memory mechanism.

A. Dynamic Software Transactional Memory

We implement an exemplary form of Dynamic Software Transactional Memory (DSTM) as a low-level application programming interface (API) for synchronizing shared data without using locks. A transaction is a sequence of steps executed by a single thread. Transactions are atomic: each transaction either commits (it takes effect) or aborts (its effects are discarded). Transactions are linearizable: they appear to take effect in a one-at-a-time order. Transactional memory supports a computational model in which each thread announces the start of a transaction, executes a sequence of operations on shared objects, and then tries to commit the transaction. If the commit succeeds, the transaction's operations take effect; otherwise, they are discarded.

Much of the simplicity of our implementation is due to our choice of non-blocking progress condition. A synchronization mechanism is obstruction-free if any thread that runs by itself for long enough makes progress (which implies that a thread makes progress if it runs for long enough without encountering a synchronization conflict from a concurrent thread). Like stronger non-blocking progress conditions such as lock-freedom and wait-freedom, obstruction-freedom ensures that a halted thread cannot prevent other threads from making progress.

Unlike lock-freedom, obstruction-freedom does not rule out livelock; interfering concurrent threads may repeatedly prevent one another from making progress. Livelock is, of course, unacceptable. Nonetheless, we believe that there is great benefit in treating the mechanisms that ensure progress as a matter of policy, evaluated by their empirical effectiveness for a given application and execution environment. Compared to lock-freedom, obstruction-freedom admits substantially simpler implementations that are more efficient in the absence of synchronization conflicts among concurrent threads.

Obstruction-freedom also allows simple schemes for prioritizing transactions because it allows any transaction to abort any other transaction at any time. In particular, a high-priority transaction may always abort a low-priority transaction. In a lock-based approach, the high-priority transaction would be blocked if the low-priority transaction held a lock that the high-priority transaction required, resulting in priority inversion and intricate schemes to circumvent this inversion. In contrast, in a lock-free implementation, the high-priority transaction may have to help the low-priority transaction complete in order to ensure that some transaction will complete.

Our obstruction-free DSTM implementation provides a simple open-ended mechanism for guaranteeing progress and prioritizing transactions. Specifically, one transaction can detect that it is about to abort another before it does so. In this case, it consults a contention manager to determine whether it should abort the other transaction immediately or wait for some time to allow the other transaction a chance to complete. Contention managers in our implementation are modular: various contention management schemes can be implemented and "plugged in" without affecting the correctness of the transaction code. Thus we can design, implement and verify an obstruction-free data structure once, and then vary the contention managers to provide the desired progress guarantees and transaction prioritization. These contention managers can exploit information about time, operating systems services, scheduling, hardware environments, and other details about the system and execution environment, as well as programmer-supplied information. These practical sources of information have been largely neglected in the literature on lock-free synchronization because of the difficulty of designing lock-free implementations that exploit such information. We believe that this approach will yield simpler and more efficient concurrent data structures, which will help accelerate their widespread acceptance and deployment.

In general, an obstruction-free implementation can be augmented with a variety of different mechanisms that attempt to control the interactions between concurrent operations in order to ensure that operations eventually complete. A simple example is to use "backoff." Using this approach, operations wait before retrying upon encountering interference. Various schemes can be chosen for deciding how long to wait. One choice is a combination of randomization and exponential back off, which is very likely to cause operations to run long enough in isolation to complete. Such schemes can be effective for improving the performance of lock-free implementations by reducing contention, and we expect that they will be similarly effective in allowing obstruction-free operations to complete. Other "out of band" contention reduction mechanisms can also be employed, including mechanisms yet to be developed. The beauty of our approach is that the obstruction-free implementations themselves will not have to be modified (and therefore will not have to be reverified) in order to use a different contention reduction mechanisms.

Other possible approaches include queuing and time stamping approaches, in which threads agree amongst themselves to "wait" for each other to finish. While simplistic applications of these ideas would give rise to some of the same problems that the use of locks does, we have much more freedom in designing more sophisticated approaches for contention reduction than when using locks, because correctness is not jeopardized by interrupting an operation at any time and allowing another operation to continue execution. We expect that contention between operations will typically be quite rare, and that repeated retries will rarely be necessary. In scenarios where this is true, we benefit from the simple and efficient obstruction-free designs and only rarely invoke the more heavy-weight contention reduction mechanisms. In contrast, in most lock-free and wait-free implementations, the mechanisms that are used to ensure the respective progress properties impose significant overhead in the typical case.

A Simple Example

We now illustrate the use of DSTM through a series of simple examples. DSTM manages a collection of transactional objects, which are accessed by transactions. A transaction is a short-lived, single-threaded computation that either commits or aborts. In this simple example, a transactional object is a container for a regular Java™ object. Java programming constructs provide a convenient implementation environment and basis for description of our techniques, although implementations for other programming and execution environments will be appreciated by persons of ordinary skill in the art. Java and Java-based marks are trademarks or registered trademarks of Sun Microsystems, Inc. in the United States and other countries.

Turning to our simple example, a transaction can access a contained regular object by opening the transactional object, and then reading or modifying the regular object. Changes to objects opened by a transaction are not seen outside the transaction until the transaction commits. If the transaction commits, then these changes take effect; otherwise, they are discarded. Transactional objects can be created dynamically at any time. The creation and initialization of a transactional object is not performed as part of any transaction.

In our illustrative Java-based implementation, a basic unit of parallel computation is the TMThread class, which extends regular Java threads. Like a regular Java thread, it provides a run( ) method that does the work. In addition, the TMThread class provides additional methods for starting, committing or aborting transactions, and for checking on the status of a transaction. Threads can be created and destroyed dynamically.

Transactional objects are implemented by the TMObject class. To implement an atomic counter, one would create a new instance of a Counter class and then create a TMObject to hold it:

Counter counter=new Counter(O);
TMObject tmobject=new TMObject(counter);

Any class whose objects may be encapsulated within a transactional object must implement the TMCloneable interface. This interface requires the object to export a public clone( ) method that returns a new, logically disjoint copy of the object: DSTM uses this method when opening transactional objects, as described below. DSTM ensures that the object being cloned does not change during the cloning, so no synchronization is necessary in the clone( ) method.

A thread calls beginTransaction( ) to start a transaction. Once it is started, a transaction is active until it is either committed or aborted. While it is active, a transaction can access the encapsulated counter by calling open( ):

```
Counter counter = (Counter)tmObject.open(WRITE);
counter.inc( );    // increment the counter
```

The argument to open( ) is a constant indicating that the caller may modify the object. The open( ) method returns a copy of the encapsulated regular Java object created using that object's clone( ) method; we call this copy the transaction's version.

The thread can manipulate its version of an object by calling its methods in the usual way. DSTM guarantees that no other thread can access this version, so there is no need for further synchronization. Note that a transaction's version is meaningful only during the lifetime of the transaction. References to versions should not be stored in other objects; only references to transactional objects are meaningful across transactions.

A thread attempts to commit its transaction by invoking commitTransaction( ), which returns true if and only if the commit is successful. A thread may also abort its transaction by invoking abortTransaction( ).

We guarantee that successfully committed transactions are linearizable, i.e., they appear to execute in a one-at-a-time order. But what kind of consistency guarantee should we make for a transaction that eventually aborts? One might argue that it does not matter, as the transaction's changes to transactional objects are discarded anyway. However, synchronization conflicts could cause a transaction to observe inconsistencies among the objects it opens before it aborts. For example, while a transaction T is executing, another transaction might modify objects that T has already accessed as well as objects that T will subsequently access. In this case, T will see only partial effects of that transaction. Because transactions should appear to execute in isolation, observing such inconsistencies may cause a transaction to have unexpected side-effects, such as dereferencing a null pointer, array bounds violations, and so on.

DSTM addresses this problem by validating a transaction whenever it opens a transactional object. Validation consists of checking for synchronization conflicts, that is, whether any object opened by the transaction has since been opened in a conflicting mode by another transaction. If a synchronization conflict has occurred, open( ) throws a Denied exception instead of returning a value, indicating to the transaction that it cannot successfully commit in the future. The set of transactional objects opened before the first such exception is guaranteed to be consistent: open( ) returns the actual states of the objects at some recent instant. Throwing an exception also allows the thread to avoid wasting effort by continuing the transaction.

An Extended Example

Consider a linked list whose values are stored in increasing order. We will use this list to implement an integer set (class IntSet) that provides insert( ), delete( ) and member( ) methods. Illustrative code fragments follow.

```
public class IntSet {
    private TMObject first;
    static class List implements TMCloneable {
        int value;
        TMObject next;
        List(int v) {
            this.value = v;
        }
```

```
        public Object clone( ) {
            List newList   = new List(this.value);
            newList.next  = this.next;
            return newList;
        }
    }
    public IntSet( ) {
        List firstList = new List(Integer.MIN_VALUE);
        this.first = new TMObject(firstList);
        firstList.next =
            new TMObject(new List(Integer.MAX_VALUE));
    }
    public boolean insert(int v) {
        List newList = new List(v);
        TMObject newNode = new TMObject(newList);
        TMThread thread =
            (TMThread)Thread.currentThread( );
        while (true) {
            thread.beginTransaction( );
            boolean result = true;
            try {
                List prevList =
                    (List)this.first.open(WRITE);
                List currList =
                    (List)prevList.next.open(WRITE);
                while (currList.value < v) {
                    prevList = currList;
                    currList =
                        (List)currList.next.open(WRITE);
                }
                if (currList.value == v) {
                    result = false;
                } else {
                    result = true;
                    newList.next = prevList.next;
                    prevList.next = newNode;
                }
            } catch (Denied d){ }
            if (thread.commitTransaction( ))
                return result;
        }
    }
    ...
}
```

The IntSet class uses two types of objects: nodes and list elements; nodes are transactional objects (class TMObject) that contain list elements (class List), which are regular Java objects. The List class has the following fields: value is the integer value, and next is the TMObject containing the next list element. We emphasize that next is a TMObject, not a list element, because this field must be meaningful across transactions. Because list elements are encapsulated within transactional objects, the List class implements the TMCloneable interface, providing a public clone( ) method.

The IntSet constructor allocates two sentinel nodes, containing list elements holding the minimum and maximum integer values (which we assume are never inserted or deleted). For clarity, we focus on insert( ). This method takes an integer value; it returns true if the insertion takes place, and false if the value was already in the set. It first creates a new list element to hold the integer argument, and a new node to hold that list element. It then repeatedly retries the following transaction until it succeeds. The transaction traverses the list, maintaining a "current" node and a "previous" node. At the end of the traversal, the current node contains the smallest value in the list that is greater than or equal to the value being inserted. Depending on the value of the current node, the transaction either detects a duplicate or inserts the new node between the previous and current nodes, and then tries to commit. If the commit succeeds, the method returns; otherwise, it resumes the loop to retry the transaction.

An attractive feature of DSTM is that we can reason about this code almost as if it were sequential. The principal differences are the need to catch Denied exceptions and to retry transactions that fail to commit, and the need to distinguish between transactional nodes and non-transactional list elements. Note that after catching a Denied exception, we must still call commitTransaction( ) to terminate the transaction, even though it is guaranteed to fail.

Conflict Reduction Techniques—Read-Only Mode and Early Release

A transaction A will typically fail to commit if a concurrent transaction B opens an object already opened by A. Ultimately, it is the responsibility of the contention manager to ensure that conflicting transactions eventually do not overlap. Even so, the IntSet implementation just described introduces a number of unnecessary conflicts. For example, consider a transaction that calls member( ) to test whether a particular value is in the set, running concurrently with a transaction that calls insert( ) to insert a larger value. One transaction will cause the other to abort or wait, since they will conflict on opening the first node of the list. Such a conflict is unnecessary, however, because the transaction inserting the value does not modify any of the nodes traversed by the other transaction. Designing the operations to avoid such conflicts reduces the need for contention management, and thereby generally improves performance and scalability.

DSTM provides several mechanisms for eliminating unneeded conflicts. One conventional mechanism is to allow transactions to open nodes in read-only mode, indicating that the transaction will not modify the object.

List list=(List)node.open(READ);

Concurrent transactions that open the same transactional object for reading do not conflict. Because it is often difficult, especially in the face of aliasing, for a transaction to keep track of the objects it has opened, and in what mode each was opened, we allow a transaction to open an object several times, and in different modes.

A revised insert( ) method walks down the list in read-only mode until it identifies which nodes to modify. It then "upgrades" its access from read-only to regular access by reopening that transactional object in WRITE mode. Read-only access is particularly useful for navigating through tree-like data structures where all transactions pass through a common root, but most do not modify the root.

Our DSTM techniques also provide a new and powerful way to reduce conflicts. Before it commits, a transaction may release an object that it has opened in READ mode by invoking the release( ) method. Once an object has been released, other transactions accessing that object do not conflict with the releasing transaction over the released object. The programmer should ensure that subsequent changes by other transactions to released objects will not violate the linearizability of the releasing transaction. The danger here is similar to the problem mentioned earlier to motivate validation; releasing objects from a transaction causes future validations of that transaction to ignore the released objects. Therefore, as before, a transaction can observe inconsistent state. The effects in this case are potentially even worse because that transaction can actually commit, even though it is not linearizable.

In our IntSet example, releasing nodes can be useful for navigating through the list with a minimum of conflicts, as illustrated by the following version of a delete( ) method with early release.

```
public boolean delete(int v) {
    TMThread thread =
        (TMThread)Thread.currentThread( );
    while (true) {
        thread.beginTransaction( );
        boolean result = true;
        try {
            TMObject lastNode  = null;
            TMObject prevNode  = this.first;
            List prevList = (List)prevNode.open(READ);
            List currList = (List)prevList.next.open(READ);
            while (currList.value < v) {
                if (lastNode != null)
                    lastNode.release( );
                lastNode = prevNode;
                prevNode = prevList.next;
                prevList = currList;
                currList = (List)currList.next.open(READ);
            }
            if (currList.value != v) {
                result = false;
            } else {
                result = true;
                prevList = (List)prevNode.open(WRITE);
                prevList.next.open(WRITE);
                prevList.next = currList.next;
            }
        } catch (Denied d){ }
        if (thread.commitTransaction( ))
            return result;
    }
}
```

As a transaction traverses the list, opening each node in READ mode, it releases every node before its prev node. A transaction that adds an element to the list "upgrades" its access to the node to be modified by reopening that node in WRITE mode. A transaction that removes an element from the list opens in WRITE mode both the node to be modified and the node to be removed. It is easy to check that these steps preserve linearizability.

Because a transaction may open the same object several times, the DSTM matches, for each object, invocations of release( ) with invocations of open(READ); an object is not actually released until release( ) has been invoked as many times as open(READ) for that object. Objects opened in WRITE mode by a transaction cannot be released before the transaction commits; if a transaction opens an object in READ mode and then "upgrades" to WRITE mode, subsequent requests to release the object are silently ignored.

Clearly, the release facility must be used with care; careless use may violate transaction linearizability. Nevertheless, we have found it useful for designing shared pointer-based data structures such as lists and trees, in which a transaction reads its way through a complex structure.

An Illustrative Implementation

We now describe an illustrative DSTM implementation. A transaction object (class Transaction) has a status field that is initialized to be ACTIVE, and is later set to either COMMITTED or ABORTED using a CAS instruction. Although native CAS support is available in many modern processor architectures, CAS functionality for Java-based software implementations may conveniently build on facilities provided by an AtomicReference class in the java.util.concurrent package that was made available to the public in source form through the Java Community Process. See generally, Java Specification Request for Concurrent Utilities (JSR166), currently archived on-line at jcp.org. Suitable CAS functionality is currently available for Java-based software implementations as part of the java.util.concurrent package incorporated into the Java 2 Platform, Standard Edition release 5.0 (J2SE 5.0), available from Sun Microsystems, Inc.

Opening a Transactional Object

Recall that a transactional object (class TMObject) is a container for a regular Java object, which we call a version. Logically, each transactional object has three fields:
1. transaction points to the transaction that most recently opened the transactional object in WRITE mode;
2. oldObject points to an old object version; and
3. newObject points to a new object version.

The current (i.e., most recently committed) version of a transactional object is determined by the status of the transaction that most recently opened the object in WRITE mode. If that transaction is committed, then the new object is the current version and the old object is meaningless. If the transaction is aborted, then the old object is the current version and the new object is meaningless. If the transaction is active, then the old object is the current version, and the new object is the active transaction's tentative version. This version will become current if the transaction commits successfully; otherwise, it will be discarded. Observe that, if several transactional objects have most recently been opened in WRITE mode by the same active transaction, then changing the status field of that transaction from ACTIVE to COMMITTED atomically changes the current version of each respective object from its old version to its new version; this is the essence of how atomic transactions are achieved in our implementation.

An interesting part of our implementation is how a transaction can safely open a transactional object without changing its current version (which should occur only when the transaction successfully commits). To achieve this, we need to atomically access the three fields mentioned above. However, current architectures do not generally provide hardware support for such atomic updates. Therefore, we introduce a level of indirection, whereby each TMObject has a single reference field start that points to a Locator object.

Figure 2:
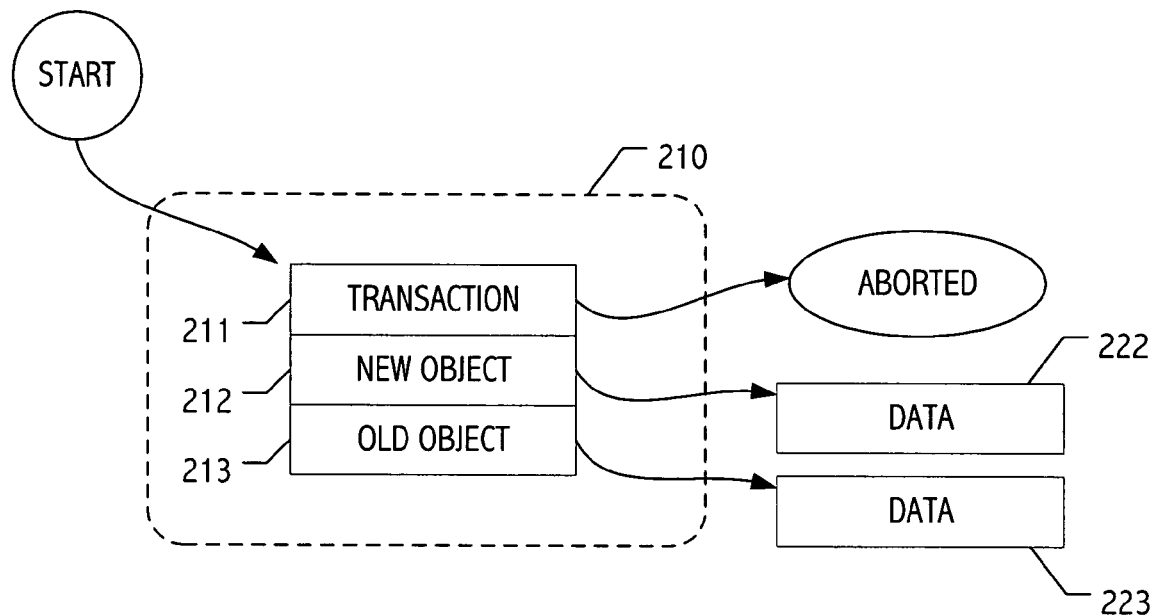
FIG. 2 depicts a locator structure used in accordance with some operations of a dynamic software transactional memory embodiment of the present invention.

FIG. 2 illustrates one implementation of a Locator object. The Locator object includes the three fields mentioned above: transaction 211 points to the transaction that created the Locator, and oldObject 213 and newObject 212 point to the old and new object versions 223 and 222, respectively. This indirection allows us to change the three fields atomically by calling CAS to swing the start pointer from one Locator object to another.

Figure 3:
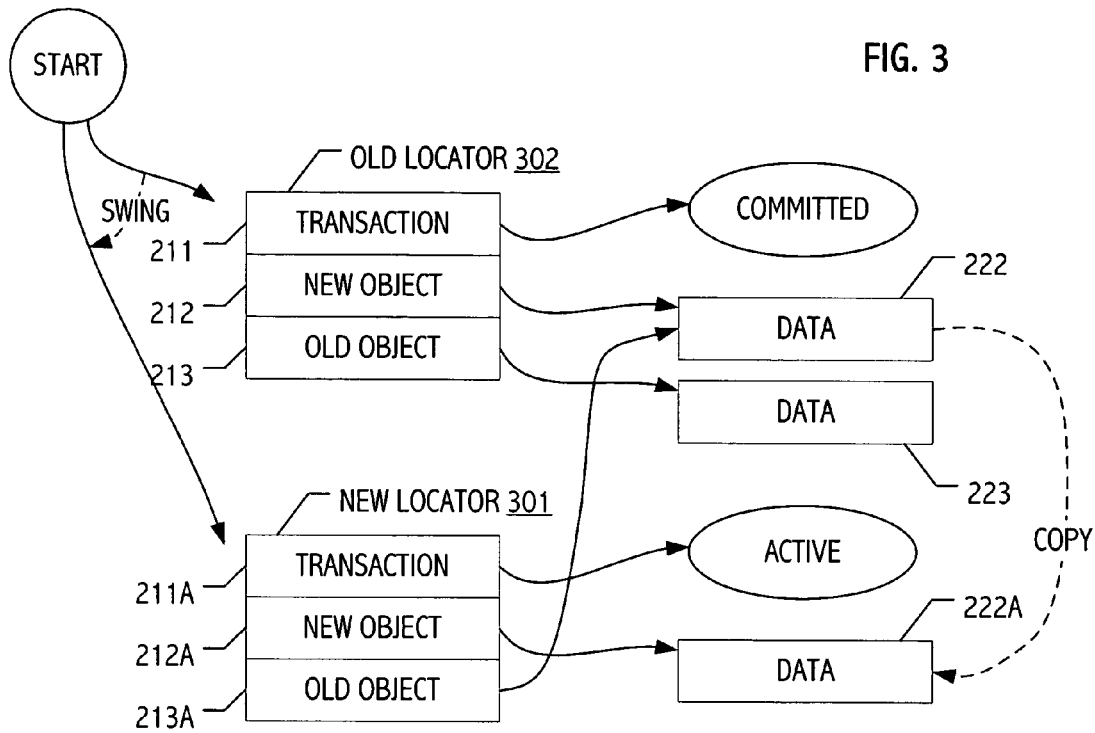
FIG. 3 depicts relationship between two locator structures in accordance with states typical, in some dynamic software transactional memory embodiments of the present invention, of opening a transactional object after a recent commit.
Figure 4:
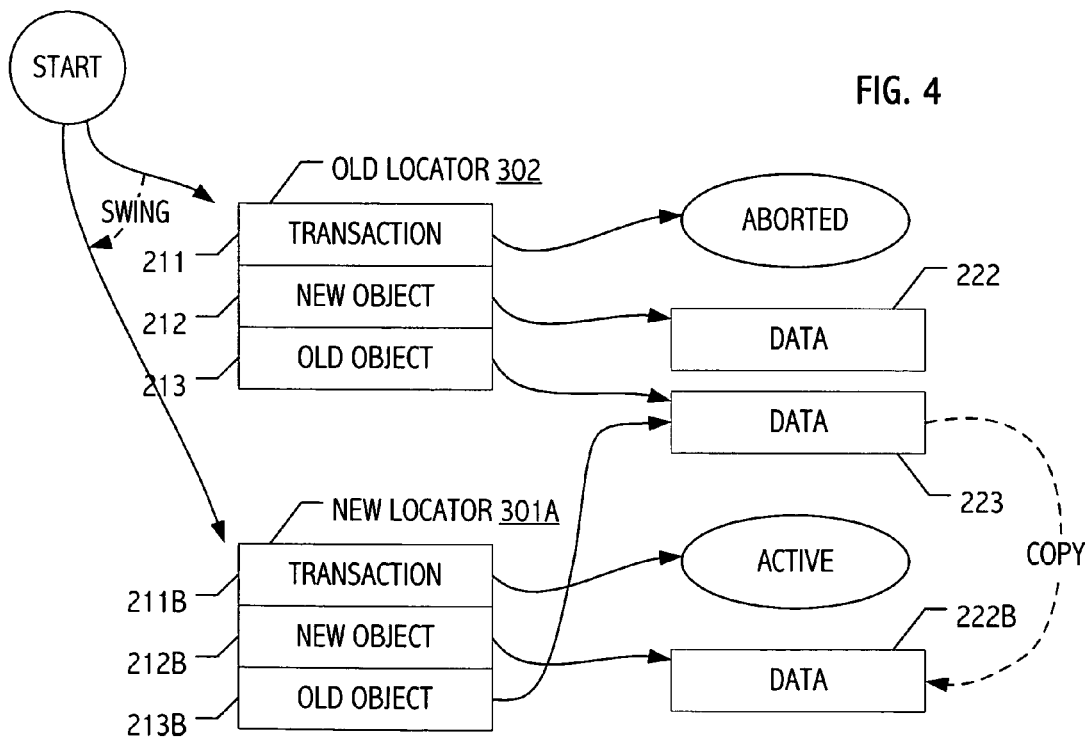
FIG. 4 depicts relationship between two locator structures in accordance with states typical, in some dynamic software transactional memory embodiments of the present invention, of opening a transactional object after a recent abort.

Referring to FIGS. 3 and 4, we now explain in more detail how transaction A opens a TMObject in WRITE mode. Let B be the transaction that most recently opened the object in WRITE mode. A prepares a new Locator object 301 with transaction set to A. Suppose B is committed. A sets the new locator's oldObject field 213A to the current newObject (222), and the new newObject field to a copy (222A) of the current newObject (see FIG. 3). (Recall that every class that can be encapsulated by a transactional object must export a public clone( ) method.) A then calls CAS to change the object's start field from B's old locator 302 to A's new locator 301. If the CAS succeeds, the open( ) method returns the new version, which is now the transaction's tentative version of this object. A can update that version without further synchronization. If the CAS fails, the transaction rereads the object's start field and retries. Suppose, instead, that B is aborted. A follows the same procedure, except that it sets the oldObject field of new locator 301A to the current oldObject and the newObject field 212B to a copy (222B) of the current oldObject (see FIG. 4).

Finally, suppose B is still active. Because B may commit or abort before A changes the object's start field, A cannot determine which version is current at the moment its CAS succeeds. Thus, A cannot safely choose a version to store in the oldObject field of its Locator (301 or 301A). The beauty of obstruction-freedom is that A does not need to guarantee progress to B, and can therefore resolve this dilemma by attempting to abort B (by using CAS to change B's status field from ACTIVE to ABORTED) and ensuring that B's status field is either ABORTED or COMMITTED before proceeding (the change may have been effected by the action of some other transaction). This resolution also highlights an important property of our algorithm with respect to the integration of contention managers: Because A can determine in advance that it will interfere with B, it can decide, based on the policy implemented by its contention manager (discussed in the next section), whether to abort B or to give B a chance to finish.

Read-only access can also be provided. For example, in one illustrative implementation a thread-local read-only table may be employed. When A opens a transactional object o for reading, it identifies the last committed version v (possibly by aborting an active transaction) exactly as for write access. However, instead of installing a new Locator object, A adds the pair (o, v) to a thread-local read-only table. To match invocations of open(READ) and release( ), the transaction also maintains a counter for each pair in its read-only table. If an object is opened in READ mode when it already has an entry in the table, the transaction increments the corresponding counter instead of inserting a new pair. This counter is decremented by the release( ) method, and the pair is removed when the counter is reduced to zero.

Implementations that facilitate read-only access are described in greater detail below. Of course, based on the description herein, persons of ordinary skill in the art will appreciate a variety of suitable alternatives. While the use of particular structures and techniques, including the use of a thread-local read-only table, provides a useful descriptive context, it will be understood that these structures and techniques are merely illustrative of a particular adaptation of our techniques.

Validating and Committing a Transaction

After open( ) has determined which version of an object to return, and before it actually returns that version, the DSTM must validate the calling transaction in order to ensure that the user transaction code can never observe an inconsistent state. Validation involves two steps:
1. For each pair (o, v) in the calling thread's read-only table, verify that v is still the most recently committed version of o.
2. Check that the status field of the Transaction object remains ACTIVE.

Committing a transaction involves two steps: validating the entries in the read-only table as described above, and calling CAS to attempt to change the status field of the Transaction object from ACTIVE to COMMITTED.

Costs

In the absence of synchronization conflicts, a transaction that opens W objects for writing requires W+1 CAS operations: one for each open( ) call, and one to commit the transaction. Synchronization conflicts may require more CAS operations to abort other transactions. These are the only strong synchronization operations needed by our DSTM implementation: once open( ) returns an object version, there is no need for further synchronization to access that version. A transaction also incurs the cost of cloning objects opened for writing; cloning is achieved using simple load and store instructions because the DSTM ensures objects being cloned do not change during the cloning.

Validating a transaction that has opened W objects for writing and R objects (R≥1) for reading (that have not been released) requires O(R) work. Because validation must be performed whenever an object is opened and when the transaction commits, the total overhead due to the DSTM implementation for a transaction that opens R for reading and W objects for writing is O((R+W)R) plus the cost of copying each of the W objects opened for writing once. Note that, in addition to reducing the potential for conflict, releasing objects opened for reading also reduces the overhead due to validation: released objects do not need to be validated. Thus, if at most K objects (K≥1) are open for reading at any time, then the total overhead for a transaction is only O((R+W)K) plus the cost of cloning the objects.

Representative API for Dynamic Transactional Memory

A variety of issues can affect the definition of an application programming interface (API) for any particular implementation of dynamic transactional memory. Tradeoffs between functionality, convenience, and efficiency of implementation affect the choice of an API, so different APIs may be desirable for different implementations. Accordingly, we do not specify the API. Instead, we present a sample API that provides a useful descriptive context for some of the main ideas behind dynamic transactional memory. Of course, the invention is defined solely by the claims that follow and exploitations in accordance with the claims need not precisely correspond with any aspect of any sample API or code realization. Indeed, based on the description herein (including that of any sample API), persons of ordinary skill in the art will appreciate a wide range of suitable adaptations for a given implementation. Accordingly, subject to the foregoing, we now present a representative API that refines certain aspects illustrated above with respect to the simple Java-based example.

We illustrate the use of our representative API with several examples, including examples that closely parallel some of the preceding description, though in a procedural language (rather than object-oriented) context. We begin with a core set of operations, and then show how to implement a linked-list-based set with them. Then, we enrich the API with more operations, and demonstrate how these can be used to achieve more scalable implementations. We present the operations of a basic API first, and then add description of tm_read( ) and tm_release( ) operations.

blockid tm_alloc(int size)
    Purpose: Allocates a new logical block.
    Parameters: Size in bytes of block to be allocated.
    Return value: Logical block identifier.
    Remarks: Other transactional memory calls identify the new block by using the block id.

void tm_delete(blockid b)
    Purpose: Deallocate a logical block that is no longer required.
    Parameters: Block id of logical block to be deallocated.
    Return value: None.
    Remarks: In the examples used herein, we have not addressed the deallocation of logical blocks after use. This issue can in many cases be addressed by using Value Recycling techniques we have separately proposed, in which case we would use the tm_delete( ) operation to deallocate logical blocks.

void *tm_init(blockid b)
    Purpose: Used to initialize a newly-allocated block.
    Parameters: Block id of logical block to be initialized.
    Return value: Pointer to data block where initial value can be stored.
    Remarks: The returned pointer can be used only until the first call to tm_open for this block. Initialization is not part of a transaction; even if initialization is done within a transaction that later aborts, the initialization remains.

int tm_sizeof(blockid b)
    Purpose: Determine size of logical block.
    Parameters: Block id.
    Return value: Size in bytes of specified logical block.
    Remarks: A logical block's size is the size specified when it was allocated by tm_alloc( ).

trans_t *tm_start( )
    Purpose: Start a transaction.
    Parameters: None.
    Return value: None.
    Remarks: In the simple API presented here for the purposes of introducing the idea of dynamic transactional memory, we assume that transactions are not nested. For this simple case, no parameters are needed for tm_start( ). It is straightforward to extend the API, and the implementation approaches described later, to support nested transactions.

void *tm_open(trans_t *t, blockid b)
    Purpose: Open a logical block for access within a transaction.
    Parameters: Block id of logical block to be accessed.
    Return value: Pointer to private copy of logical block's contents.
    Remarks: Invoked within a transaction (i.e., after the invoking thread has called tm_start( ) and before it has subsequently called tm_abort( ) or tm_commit( )). Returns a pointer to a tentative data block which can be used for reading values from the block and for storing values that will take effect if and when the enclosing transaction successfully commits. Multiple calls to tm_open( ) for the same block in the same transaction will return the same pointer. Calls to tm_open( ) for different blocks in the same transaction may yield inconsistent values, but any transaction that observes such inconsistencies is guaranteed not to commit successfully. Thus, code that risks behaving incorrectly if it observes inconsistent data should call tm_validate( ) (described later) to ensure data is valid before executing the risky code. Pointers returned by tm_open( ) should be used only within the lifetime of the enclosing transaction and should not be stored in data blocks.

bool tm_commit(trans_t *t)
    Purpose: Attempt to commit current transaction.
    Parameters: None.
    Return value: True if transaction commits success fully, false otherwise.

void tm_abort(trans_t *t)
    Purpose: Explicitly abort current transaction.
    Parameters: None.
    Return value: None.
    Remarks: An alternative is to treat tm_start( ) as an abort if it is invoked during a transaction. However, some implementations might perform better if transactions that are not intended to be completed are explicitly aborted.

bool tm_validate(trans_t *t)
    Purpose: Determine whether current transaction can still commit successfully.
    Parameters: None.
    Return value: False if current transaction of invoking thread is destined to abort, true if it can still commit.
    Remarks: Useful for determining whether data read so far in transaction was all consistent (if not, transaction will not commit successfully). Can also be used to avoid expensive computation if the transaction cannot commit.

void *tm_read(trans_t *t, blockid b)
   Purpose: Open a logical block within a transaction for read only access.
   Parameters: Block id of logical block to be read.
   Return value: Pointer to private copy of logical block's contents.
   Remarks: Data written to the private copy will not be stored to the logical block upon successful commit of the transaction.
void tm_release(trans_t *t, blockid b)
   Purpose: Release a block previously opened with tm_read( ) from the transaction.
   Parameters: Block id of logical block to be released from transaction.
   Return value: None.

Before we discuss the API in greater depth, some terminology and an overview is in order. First, we view dynamic transactional memory as a means for accessing a collection of logical blocks; references to such blocks are called logical block identifiers, or block ids for short. Some special value exists that will never be used as a block id; this can be used to indicate the absence of a block. As described later, a natural implementation approach is use pointers to some structure as block ids, so a null pointer serves this purpose. A new block of a specified size can be allocated using tm_alloc( ). The contents of a newly allocated block can be initialized by invoking tm_init( ) with its block id, and then storing the initial value of the logical block at the location specified by the pointer returned by this call. This is done before the block id of the new block is made available to any other thread or transaction, so there is no risk of partially-initialized data being observed. Once initialized, the value of a logical block can be changed only by a transaction that accesses that logical block and then commits successfully.

The basic anatomy of a transaction is as follows. A thread begins a transaction by invoking tm_start( ). During the transaction, the thread can access a number of logical blocks; to access one logical block, the thread invokes tm_open( ) with the block id for that block, and this call returns a pointer to a data block containing a value of the logical block. The thread can then read from this data block using ordinary loads and update it using ordinary stores. It is guaranteed that no other thread is using this data block, so the thread does not need to be concerned with concurrent accesses. Also, stores to this data block do not affect the value of the logical block with which it is associated until the transaction successfully commits; we call this data block the thread's tentative data block for that logical block. Note that pointers to tentative data blocks are for use by and within a single transaction only, and do not mean anything outside that transaction. In particular, these pointers should not be stored in data blocks to refer to other logical blocks; only logical block ids should be used for this purpose. The thread attempts to commit its transaction by invoking tm_commit( ), which returns true if the commit is successful, and false otherwise. If the commit is not successful, then the transaction does not affect the value of any logical block. Otherwise, the value of all logical blocks accessed by the transaction are atomically changed to the values of the associated tentative blocks. Furthermore, it is guaranteed that no block that is accessed by a successful transaction changes between the first time the transaction opens that block and the point at which the transaction commits. This is the power of the transactional approach: the programmer does not have to reason about data changing between the time they are read and the time at which updates based on the values read are made.

We ensure that the value a transaction sees for each logical block it accesses (i.e., the contents of its tentative block for that logical block immediately after it is returned from tm_open( ), and before the transaction updates the tentative block) was the value of the logical block at some point during the execution of tm_open( ). We do not guarantee that the values seen for two different logical blocks accessed by a transaction were the current values of those blocks at the same time. However, it follows from the guarantees made by tm_commit( ) that the values seen for all blocks accessed by a transaction that successfully commits are consistent with each other. Therefore, there is no risk that incorrect values that are stored in tentative blocks because of such inconsistencies will be committed. In some cases, however, there may be a risk that the transaction code might behave incorrectly if it sees inconsistent data. In other cases, the transaction may waste a significant amount of time trying to complete when it is already destined to fail. To allow programmers to avoid both situations, a tm_validate( ) operation is also provided, which returns true if the current transaction could still commit. For simplicity, we simplify our exposition by ignoring the issue of when a logical block can be deallocated. However, techniques, such as described in co-pending, commonly-owned U.S. patent application Ser. No. 10/340,156, filed Jan. 10, 2003, entitled "VALUE RECYCLING FACILITY FOR MULTITHREADED COMPUTATIONS" and naming Mark S. Moir, Victor Luchangco and Maurice Herlihy as inventors, may be employed to address this issue. In a realization that applied such techniques to deallocate logical blocks after use, we would also want a tm_delete( ) operation by which logical blocks could be destroyed.

With this overview in mind, we now present an example that demonstrates the use of the basic dynamic transactional memory operations to implement a set using a linked list. We present three examples. The first uses only the basic transactional memory API, as summarized above. The next two examples introduce optional extensions to this API, and demonstrate how their inclusion can support more scalable data structure implementations. In these simple examples, we omit the transaction argument from the calls to the transactional operations to avoid cluttering the examples; it should be clear from context how to modify these examples to conform to the actual API presented, above.

Based Linked List Example

We now present an exemplary exploitation, a set of integers supporting insert and delete operations implemented using a singly linked list. Values are stored in the linked list in increasing order. Each linked list node is stored in a single logical block and contains a value and a block identifier for the next logical block in the list.

```
typedef struct list_s {
   blockid next;
   int value;
} list_t;
blockid CreateList( ) {
00 blockid f_block = tm_alloc(sizeof(list_t));
01 blockid l_block = tm_alloc(sizeof(list_t));
02 list_t *first = (list_t *) tm_init(f_block);
03 list_t *last = (list_t *) tm_init(l_block);
04 first->next = l_block;
05 first->value = -MAXINT;
06 last->next = (blockid) NULL;
07 last->value = MAXINT;
08 return f_block;
}
```

A CreateList( ) procedure allocates two logical blocks (lines 0 and 1), acquires pointers to data blocks in order to initialize them (lines 2 and 3), and then initializes them (lines 4 through 7) so that the first points to the second, the first contains −MAXINT, and the second contains MAXINT. These two nodes act as sentinels to simplify the insertion and deletion cases so that no special cases are necessary. It is assumed that −MAXINT and MAXINT are never inserted or deleted. CreateList( ) returns the logical block id of the block; this is the block id used to identify the list to subsequent insert( ) and delete( ) operations. Note that CreateList( ) does not involve any transactions; as explained earlier, it is not necessary to initialize newly allocated blocks with transactions because they are initialized before any transaction accesses them.

The following code implements the insert( ) and delete( ) operations.

```
bool insert(blockid L; int v) {
09  blockid nodeid = tm_alloc(sizeof(list_t));
10  list_t *node = (list_t*) tm_init(nodeid);
11  node->value = v;
12  while (1) {
13    tm_start( );
14    list_t *prev = tm_open(L);
15    list_t *curr = tm_open(prev->next);
16    while (curr->value < v && tm_validate( )) {
17      prev = curr;
18      curr = tm_open(curr->next);
19    }
20    if (curr->value == v) {
21      if (tm_commit( ))
22        return false;
23    } else {
24      node->next = prev->next;
25      prev->next = nodeid;
26      if (tm_commit( ))
27        return true;
28    }
29  }
}
bool delete(blockid L; int v) {
30  while (1) {
31    tm_start( );
32    list_t *prev = tm_open(L);
33    list_t *curr = tm_open(prev->next);
34    while (curr->value < v && tm_validate( )) {
35      prev = curr;
36      curr = tm_open(curr->next);
37    }
38    if (curr->value != v) {
39      if (tm_commit( ))
40        return false;
41    } else {
42      prev->next = curr->next;
43      if (tm_commit( ))
44        return true;
45    }
46  }
}
```

Operation of the insert( ) and delete( ) operations is similar. Therefore, we focus on the insert( ) operation. The insert( ) operation accepts an integer value v to be inserted into the set, and returns true if it is successfully inserted and false if v is already in the set. It begins by allocating a new logical block for the new list node it will potentially insert into the list, and initializing the value field to the value being inserted (lines 9 through 11). Next, the insert( ) operation repeatedly attempts to use a transaction to either insert the new node into the appropriate position in the list, or confirm that v is already in the list (lines 12 through 29). When one such transaction commits successfully, the operation completes and returns an appropriate return value; when a transaction does not commit successfully, the operation retries the loop. We now describe the transaction, when executed by thread p, in more detail.

The basic technique is to "walk" down the linked list, always maintaining a reference to a "current" node and a reference to a "previous" node. The goal is to end up with the current reference referring to the node with value v if v is already in the list, or the node containing the smallest value in the list that is greater than v if not. In either case, the previous reference should refer to the node in the list immediately preceding the node referred to by the current reference. This allows us to determine whether v is already in the list, and if not, where the new node containing v should be inserted.

In more detail, p first indicates that it is starting a new transaction by invoking tm_start( ) (line 13). It then sets up its previous reference to refer to the sentinel node containing −MAXINT and its current reference to refer to that sentinel's successor in the list (lines 14 and 15). Then, the loop at lines 16 through 19 repeatedly advances each reference by one node down the list while the value in the current node is still smaller than v.

When the loop terminates, p determines whether v is already in the list (line 20). If so, p attempts to commit its transaction (line 21) to be sure that it saw a consistent state; if it succeeds, it returns false, otherwise it retries. If p does not see v already in the list, then it attempts to insert its new node containing v. It first updates the next field of its new node to contain the logical block id of the node containing the next larger value, and then updates the next field of the previous node to contain the logical block id of p's new block (lines 24 and 25). Finally, p attempts to commit these changes, and if it does so successfully, then it returns true to indicate that it successfully inserted v into the set; otherwise it retries.

It is easy to see that transactions that successfully commit in the set implementation just described correctly maintain the linked list representation of the implemented set. One more issue bears mention. While transactions that do not commit successfully do not modify any logical blocks, and therefore do not corrupt the linked list, we must still take care to consider the behavior of our transaction code when the transaction does not commit successfully. In particular, as stated earlier, data observed by a transaction that does not commit successfully is not guaranteed to be consistent across blocks. Thus, for example, it is possible that when walking down the list, we follow a link to a node that has already been removed from the list. While our example will not behave incorrectly in this case, we may be concerned that the loop at lines 16 through 19 in the insert( ) operation for example may not terminate. In fact, this is not true in this case, but this requires some reasoning that may be difficult in more complicated examples. We can avoid this reasoning by using tm_validate( ) to break out of the loop if the transaction will not commit successfully (see line 16, for example). There is a cost associated with this call to tm_validate( ), however, and we may wish to avoid it when possible. One can imagine a variety of schemes for avoiding or reducing this cost. One example would be to perform this check less often than every iteration.

Linked List Example with Read-Only Traversal

In the previous example, a transaction that is inserting a high value will cause a concurrent transaction that is inserting a lower value to fail, because the operations both open the set of logical blocks from the start of the list up to the position where the lower value should be inserted. However, this is not necessary in this case, because the transaction inserting the higher value does not modify any of the blocks it opens while traversing down the list. To allow programmers to avoid this problem, we can extend the basic API introduced so far to include a tm_read( ) operation to open blocks "read only." Implementations of dynamic STM should ensure that if multiple transactions concurrently open the same block for read only access, this does not cause any of them to fail to commit. Thus, tm_read( ) can be used to improve performance by allowing more successful transactions to execute concurrently.

The revised insert( ) and delete( ) operations that follow illustrate use of such a tm_read( ) operation.

```
bool insert(blockid L; int v) {
00 blockid nodeid = tm_alloc(sizeof(list_t));
01 list_t* node = (list_t*) tm_init(nodeid);
02 node->value = v;
03 while (1) {
04   tm_start( );
05   blockid prevblock = L;
06   list_t *prev = tm_read(L);
07   list_t *curr = tm_read(prev->next);
08   while (curr->value < v && tm_validate( )) {
09     prevblock = prev->next;
10     prev = curr;
11     curr = tm_read(curr->next);
12   }
13   if (curr->value == v) {
14     if (tm_commit( ))
15       return false;
16   } else {
17     node->next = prev->next;
18     prev = tm_open(prevblock);
19     prev->next = nodeid;
20     if (tm_commit( ))
21       return true;
22   }
23 }
}
bool delete(blockid L; int v) {
24 while (1) {
25   tm_start( );
26   blockid prevblock = L;
27   list_t *prev = tm_read(L);
28   list_t *curr = tm_read(prev->next);
29   while (curr->value < v && tm_validate( )) {
30     prevblock = prev->next;
31     prev = curr;
32     curr = tm_read(curr->next);
33   }
34   if (curr->value != v) {
35     if (tm_commit( ))
36       return false;
37   } else {
38     prev = tm_open(prevblock);
39     prev->next = curr->next;
40     if (tm_commit( ))
41       return true;
42   }
43 }
}
```

Providing the option to open a block for read only access significantly enhances scalability for some data structures. Imagine, for example, a tree-based data structure in which all operations traverse from the root down the tree towards the leaves, but most operations modify blocks only near the leaves. In this case, opening the blocks that are not modified for read only allows most of the transactions used for these operations to execute concurrently and to commit successfully, whereas without this option, all transactions open the root, and so two successful transactions cannot execute concurrently.

In exemplary code presented above, we use tm_read( ) instead of tm_open( ) to traverse the list (see lines 6, 7, 11, 27, 28, and 32). As a result, when we have identified the logical block that we wish to modify, we have opened it only for reading. Therefore, if the API is extended to include a tm_read( ) operation, we also would like a way to "upgrade" read-only access to a logical block in order to be able to write it. One possibility is to require tm_open( ) to upgrade from read-only to write in the case that it is called on a logical block that has previously been opened for read only. This is attractive because it does not require the programmers to distinguish between opening a block for the first time and upgrading the block from read-only to write access. This is the assumption we have made for our sample API. The example therefore uses tm_open( ) to upgrade access to the blocks that are to be modified (see lines 18 and 38). We keep track of the logical block id of the previous block in order to be able to upgrade access (see lines 5, 9, 26, and 30).

Linked List Example with Early Release

Even after the modifications described in the previous section, a transaction that commits successfully to insert a low value will cause a concurrent transaction that is attempting to insert a higher value to abort because it does actually modify a block that was read by that transaction. This is normal for the standard idea of transactions. However, it is not hard to see that, provided we are careful about boundary cases, it would be acceptable for the transaction inserting the higher value to succeed even though some block(s) it has read have since been modified. To allow transaction designers to take advantage of such situations, we can further extend the dynamic transactional memory API introduced so far to provide an "early release" option that allows a transaction to explicitly remove a block that it has previously read from the set of blocks whose modification by a concurrent transaction would cause the transaction to fail. The tm_release( ) operation serves this purpose.

In the revised insert( ) and delete( ) operations that follow, we show how the previous example can be modified to allow concurrent transactions to succeed more often using tm_release( ).

```
bool insert(blockid L; int v) {
00 blockid nodeid = tm_alloc(sizeof(list_t));
01 list_t *node = (list_t *) tm_init(nodeid);
02 node->value = v;
03 while (1) {
04   tm_start( );
05   blockid prevblock = L;
06   list_t *prev = tm_read(L);
07   list_t *curr = tm_read(prev->next);
08   while (curr->value < v) {
09     blockid blocktorelease = prevblock;
10     prevblock = prev->next;
11     tm_release(blocktorelease);
12     prev = curr;
13     curr = tm_read(curr->next);
14   }
15   if (curr->value == v) {
16     if (tm_commit( ))
17       return false;
18   } else {
19     node->next = prev->next;
20     prev = tm_open(prevblock);
21     prev->next = nodeid;
22     if (tm_commit( ))
23       return true;
24   }
25 }
}
bool delete(blockid L; int v) {
26 while (1) {
27   tm_start( );
```

```
              -continued 28    blockid prevblock = L;
29    list_t *prev = tm_read(L);
30    list_t *curr = tm_read(prev->next);
31    while (curr->value < v) {
32       blockid blocktorelease = prevblock;
33       prevblock = prev->next;
34       tm_release(blocktorelease);
35       prev = curr;
36       curr = tm_read(curr->next);
37    }
38    if (curr->value != v) {
39       if (tm_commit( ))
40          return false;
41    } else {
42       blockid blocktoremove = prev->next;
43       prev = tm_open(prevblock);
44       curr = tm_open(blocktoremove);
45       prev->next = curr->next;
46       if (tm_commit( ))
47          return true;
48    }
49 }
}
```

Observe that we now invoke tm_release( ) (lines 11 and 34) in order to release blocks that are before our "previous" block in the list. In preparation for this, we must record the logical block id of that block before we overwrite the variable that contains it as we move down the list (see lines 9 and 32). Furthermore, we have also changed the delete( ) operation so that it invokes tm_open( ) on the block that it is removing, as well as its predecessor (lines 42 and 44).

To see why this is done, consider the following example. Suppose we have four list nodes with logical block ids A, B, C, and D, containing values 10, 20, 30, and 40, respectively. Consider a delete (20) operation and a delete (30) operation executing concurrently. Without the above mentioned modification, the following scenario would be possible. First, the delete (20) operation reaches a state in which it has invoked tm_open(A) (at line 43) in preparation for changing block A's next field to refer to block C. Note that, because we are assuming that we have not made the above-described modification, this operation has not invoked tm_open(B) (which it does at line 44 with the modification). Next, suppose the delete (30) operation reaches a similar state, in which it has invoked tm_open(B) at line 43 in preparation for changing block B's next field to refer to block D in order to effect the deletion of 30. Note that, at this point, the delete (30) operation has invoked tm_release(A) (its previous block is B and its current block is C). Therefore, the transaction of the delete (20) operation can commit successfully without preventing the transaction of the delete (30) operation from subsequently committing successfully too. If both transactions commit in that order, the 30 will not be correctly removed from the list, as block B is no longer the block in the list that points to it. Having the delete (20) operation also invoke tm_open(C) as described above causes the second transaction to fail, and therefore avoids this problem.

Note that, in order to understand this example in detail, and to gain confidence that the set implementation is correct, one should have some experience with reasoning about interactions between concurrent modifications to shared data structures, and about correctness conditions such as linearizability. Therefore, the early release option represents a significant departure from traditional transactional models, in which programmers do not have to concern themselves with reasoning about concurrency at all when considering safety properties (they must still deal with the consequences of transactions failing due to interference from concurrent transactions). Nonetheless, we believe that the inclusion of this functionality will provide an important "middle ground" between using traditional transactions (and not reasoning about concurrency at all), and having no transactional support whatsoever—which significantly complicates design and verification. Of course, designers who are not comfortable with this level of reasoning can simply avoid using tm_release( ) and continue to assume the traditional transactional behavior.

Implementation Approach

In this section, we give a high-level description of an approach we propose for implementing obstruction-free dynamic transactional memory. For now we describe an approach for implementing only the "basic" transactional memory API (that is, without operations supporting read-only access or early release).

We adopt an optimistic approach to implementing transactional memory: A transaction maintains a tentative data block for each logical block that it opens, and it applies its operations to that tentative data block. When the transaction commits, the values in the transaction's tentative data blocks atomically become the current values of the corresponding logical blocks.

The key to the simplicity of our approach lies in exploiting the weaker requirements of obstruction-freedom, as compared to lock-freedom and wait-freedom. In particular, because obstruction-freedom requires progress to be made only in the case that a single transaction runs in isolation, we do not need to maintain the possibility that multiple transactions accessing the same logical block can all commit successfully in the future. Thus, it is permissible for a transaction that encounters interference from another concurrent transaction to simply abort that transaction, which substantially simplifies the transaction state that needs to be maintained per logical block. In this section, we describe some of the main ideas behind this approach to implementing obstruction-free transactional memory.

Initial simplifying assumptions: To simplify our description, we assume for now that we have infinite memory (so there is no need to reclaim memory) and that we have synchronization primitives, such as a compare-and-swap (CAS) operation, which can atomically update arbitrary-sized memory locations. Later we discuss how to eliminate these assumptions by showing how to refine the algorithm to synchronize only on reasonably sized memory locations and how to reuse or reclaim the auxiliary data structures used by our transactional memory implementation. We also assume throughout most of this description that the logical blocks all have the same size. It is straightforward to extend the approach described here to support logical blocks of different sizes.

Data Structures

There are three primary types of data structures employed in our implementation: transaction descriptors, data blocks and data block locator records (locators). Because we do not have hardware support for atomically accessing multiple memory locations, the effect of atomically changing multiple logical blocks must be achieved by modifying a single per-transaction location in shared memory. For this purpose, each transaction has a transaction descriptor, containing a single field statusCode, which indicates whether the transaction is active, committed, or aborted:

```
typedef enum {
   ABORT_CODE, ACTIVE_CODE, COMMIT_CODE
} statusCode_t;
```

-continued

```
typedef struct trans_s {
    statusCode_t statusCode;
} trans_t;
```

The statusCode_t type shows defined constants representing the values abort, active, and commit, respectively.

Values for logical blocks are stored in data blocks, whose structure will, in general, be application-specific. For each logical block, we use a locator to track the current (most recently committed) data block as well as the tentative data block for the active transaction (if any) that has opened that logical block. Recall that an obstruction-free implementation does not need to maintain more than one tentative data block at a time for a logical block. Therefore the locator for each logical block contains two pointers to data blocks: oldData and newData. As explained in more detail below, the interpretation of these two fields depends on the status of the transaction that most recently opened this logical block. Thus, a locator also includes a pointer to the transaction descriptor for the transaction that most recently opened the associated logical block:

```
typedef struct locator_s {
    trans_t* trans; // pointer to transaction descriptor
    void* oldData; // (previously) committed data
    void* newData; // tentative or newly committed data
} locator_t;
```

For convenience, we say that a locator points to a transaction descriptor when the trans field of that locator points to that transaction descriptor. In the simple approach described in this section, a logical block id is simply a pointer to the associated locator.

The Approach

We now explain how a logical block's locator and the transaction descriptor to which it points are together interpreted to identify the current data block for that logical block; then we explain how the transactional memory operations are implemented using this interpretation. Given the locator l for a particular logical block:
  a. If l.trans→statusCode∈{active,abort} then l.oldData identifies the current data block for the logical block.
  b. If l.trans→statusCode=commit then l.oldData identifies the current data block for the logical block.

This interpretation lends itself to an efficient implementation of obstruction-free dynamic STM. To see why, first observe that changing td.statusCode from active to abort for some transaction descriptor td does not change the current data block for any logical block. Next observe that if td.statusCode changes from active to commit then for every logical block whose locator points to td, the current data block for that logical block changes from the data block pointed to by the oldData field of the locator to the data block pointed to by the newData field of the locator (and the current block does not change for any logical block whose locator does not point to td). By "the current data block changes" we mean that the identity of the current data block changes, not its contents. To avoid confusion, when we refer to the contents of the data block, we typically do so explicitly.

Therefore, an important strategy behind our approach is as follows. A new transaction is initialized as active. It can subsequently be aborted—by atomically changing its statusCode field from active to abort—without affecting the current value of any logical block. The transaction is committed by atomically changing its statusCode field from active to commit. Recall that for now we are assuming infinite memory, so let us assume that every call to tm_open( ) allocates a fresh tentative data block. Thus, the contents of a tentative data block are never modified (after the block has been initialized by tm_open( )) other than by the transaction to which it belongs, and the contents of a data block that has been committed are never changed again. Therefore, to achieve correct transactional semantics, it suffices to ensure the following three properties for each logical block opened by each transaction that commits successfully:
  1. the transaction's tentative data block for this logical block contains a copy of the current data block for this logical block at the moment that tm_open( ) returns a pointer to this tentative data block;
  2. the current data block for the logical block does not change between the moment that tm_open( ) returns and the moment that the transaction commits; and
  3. at the moment that the transaction commits, the newData field of the logical block's locator points to the transaction's tentative data block for this logical block and the trans field points to the transaction's descriptor.

To achieve the first and third properties above, tm_open( ) determines the current block for the logical block, copies its contents to a newly-allocated tentative data block, and then modifies the locator so that its newData field points to the new tentative block and its trans field points to the transaction's descriptor. Furthermore, to preserve the current data block until the subsequent commit, tm_open( ) should also store a pointer to this block in the oldData field of the locator. Provided tm_open( ) has correctly determined the current block, this does not disturb the current block, according to the interpretation of locators and transaction descriptors given above, because the transaction's statusCode can only be active or abort while it is executing tm_open( ).

Recall that determining the current data block for a particular logical block requires information from the logical block's locator as well as the transaction descriptor to which it points. However, we cannot read these two data structures atomically in order to determine the current data block, and even if we could, there would be a risk that the transaction descriptor would change before we updated the locator, potentially resulting in the block we previously determined to be current no longer being current. We deal with this problem as follows. First, we read the locator and subsequently modify it using CAS. If the CAS fails, then we retry, which is acceptable because this can happen only as the result of activity by a concurrent transaction, in which case obstruction-freedom does not require progress. If the CAS succeeds, then we can infer that the locator did not change between the time we read it and the time the CAS succeeded. Thus, by reading the transaction descriptor pointed to by the locator between reading the locator and performing the CAS on it, we can be sure that if the CAS succeeds then the data block we determine to be current based on the values read from the locator and the transaction descriptor to which it points was indeed the current data block at the time we read the transaction descriptor. If the statusCode of the transaction descriptor was abort or commit, then we can be sure that the data block we identified as current is still current when the CAS succeeds, as these values never change in a transaction descriptor. On the other hand, if the transaction to which the locator pointed was active, then there is a risk that this statusCode would change before the CAS succeeds, thereby changing the current data block for the logical block, resulting in the CAS installing an incorrect value (in the oldData field) for the current value.

To avoid this problem, if tm_open( ) encounters a locator that points to an active transaction, then that transaction must be aborted before tm_open( ) can safely attempt to modify the locator. This is achieved by using CAS to attempt to atomically change the statusCode field of that transaction's descriptor from ACTIVE_CODE to ABORT_CODE. Either the CAS succeeds, or some other CAS changes the descriptor to ABORT_CODE or to COMMIT_CODE; in either case, there is no risk that it will change again in the future, so we can reread the descriptor and rely on the value we obtain. (Later, we consider alternative policies such as pausing to give the transaction a chance to finish before attempting to abort it.) Attempting to abort the competing transaction also ensures that it will not mistakenly commit later, even after we have removed its tentative block pointer from the newData field of the locator (thereby violating property 3 above for that transaction).

Operations

Below we present pseudocode that demonstrates how each of the basic operations can be implemented. This pseudocode is somewhat simplified. For example, it assumes that every logical block has the same size BLOCK_SIZE, and it does not support transactions that open the same logical block multiple times, as real implementations should. Given the descriptions here of our approach, it is straightforward for one skilled in the art to extend this pseudocode to remove these simplifications.

To start a transaction, a thread allocates a new transaction descriptor and initializes it to ACTIVE_CODE:

```
trans_t *tm_start( ) {
    trans_t *trans = (trans_t *) malloc(sizeof(trans_t));
    trans->statusCode = ACTIVE_CODE;
    return trans;
}
```

To create a new logical block, a thread allocates memory for the block's locator, and initializes it with a dummy committed transaction, and allocates a data block for the newData field. (Recall that we are assuming a fixed block size for now.)

```
locator_t *tm_alloc( ) {
    locator_t *locator = (locator_t *)
        malloc(sizeof(locator_t));
    // initialize locator's transaction field with committed
    // transaction
    locator->trans = (trans_t *)malloc(sizeof(trans_t));
    locator->trans->statusCode = COMMIT_CODE;    // dummy
                                                  // committed
                                                  // transaction
    locator->newData = malloc(BLOCK_SIZE);    // initial value
    locator->oldData = NULL;    // not needed
    return locator;
}
```

To provide a pointer through which a newly allocated logical block can be initialized, we simply return the newData pointer.

```
void *tm_init(locator_t *locator) {
    return locator->newData;
}
```

To open a logical block, we make use of an auxiliary function that returns a pointer to the current data block for that logical block. As explained earlier, if we encounter an active transaction at this block, we attempt to abort it and then reread its statusCode field. The read_committed( ) function can return an incorrect block, but only if the locator changes while read_committed( ) is executing; in this case the CAS in tm_open( ) (presented next) will fail, so no harm will be done.

```
void *read_committed(locator_t *locator) {
    trans_t *trans = locator->trans;
    // if transaction is active, try to abort it
    if (trans->statusCode == ACTIVE_CODE)
        CAS(&trans->statusCode, ACTIVE_CODE, ABORT_CODE);
    // transaction is now either committed or aborted
    if (trans->statusCode == COMMIT_CODE)
        return locator->newData;    // transaction committed
    else
        return locator->oldData;    // transaction aborted
}
```

As explained earlier, a transaction opens a block as follows. It creates a new locator the replace the current one. The new locator is initialized so that the trans field is a pointer to the calling transaction and the newData field is a pointer to a newly-allocated tentative data block. The transaction enters a loop in which it reads the current locator. It copies that locator's data block into the new tentative block, and sets the new locator's oldData field to point to the committed data block. It then calls CAS to change the block's locator field from the old value to the new value. If it succeeds, it returns a pointer to the (tentative) data block. If it fails, it retries.

```
void *tm_open(trans_t *trans, locator_t *locator) {
    // initialize new locator value
    locator_t newLocator;
    newLocator.trans = trans;
    void *tentative = malloc(BLOCK_SIZE);
    newLocator.newData = tentative;
    // install new locator value
    while (TRUE) {
        // copy block's locator
        locator_t oldLocator = *locator;
        // get address of most recently committed data block
        void *committed = read_committed(locator);
        // copy data block to new locator's block
        memcpy(tentative, committed, BLOCK_SIZE);
        // point back to committed data block
        newLocator.oldData = committed;
        // try to install
        if (CAS(locator, oldLocator, newLocator))
            return tentative;    // success!
    }
}
```

A transaction commits by calling CAS to attempt to change the statusCode field from ACTIVE_CODE to COMMIT_CODE:

```
bool tm_commit(trans_t *trans) {
    return CAS(&trans->statusCode, ACTIVE_CODE,
        COMMIT_CODE));
}
```

A transaction aborts by storing ABORT_CODE in its statusCode field (there is no need to use CAS because the transaction does not concurrently attempt to commit itself):

```
void tm_abort(trans_t *trans) {
    trans->statusCode = ABORT_CODE;
}
```

A transaction validates itself simply by checking if it is still active:

```
bool tm_validate(trans_t *trans) {
    return (trans->statusCode == ACTIVE_CODE);
}
```

Using Practical Synchronization Primitives

Thus far, we have assumed for ease of exposition that the CAS instruction operates on arbitrary-sized memory locations, and in particular, on a memory location large enough to hold a locator. However, the locator contains three pointers, and CAS operations on typical systems operate on locations that hold only one or two pointers. In this section, we describe how one can modify the previous section's implementation to use CAS operations that operate only on these smaller locations.

We add a level of indirection through a block header for accessing the locator of a logical block. The block header stores basic information about a block in the block_t data structure:

```
typedef struct block_s {
    locator_t *start;    // pointer to locator
} block_t;
```

Now, a logical block identifier (block id) is a pointer to the logical block's block header, rather than a pointer directly to a locator. The start field points to a locator. A transaction updates the locator of a logical block by allocating a new locator, initializing its fields with appropriate values, and then using CAS to change the start field atomically from the old locator to the new.

This simple indirection is sufficient if memory is never reclaimed and reused. Nevertheless, practical implementations will reuse memory occupied by defunct locators. We discuss some memory reclamation techniques, below. Memory reuse introduces the well-known "ABA problem," in which a thread wrongly concludes that a locator's value has not changed because a pointer to that locator appears not to have changed. The following example illustrates the problem.

1. Transaction t reads the address of locator l for logical block b, prepares a new locator l', and pauses.
2. Another transaction t' replaces l with another locator, and eventually reuses the memory occupied by l. Transaction t' initializes l to a new value, and installs a pointer to l in the b's block header.
3. Transaction t resumes execution, calls the CAS operation, and incorrectly replaces the address of l with the address of l'.

The source of the error is that l is attempting to replace one locator value with another, but is instead replacing one locator address with another.

One common and simple way to avoid the ABA problem is to tag each locator address with a version number. Specifically, we extend the start field with a counter that is incremented each time the field is modified. Each time a locator is reused, its address is tagged with a different version number, ruling out the erroneous behavior in the example. We assume here that the counter field is large enough that we can ignore the possibility that the counter will wrap around in the course of a single transaction. We say that such a counter is a safe counter.

These modifications are illustrated by the following code fragment:

```
/* assuming 32-bit pointers */
#define COUNTER_SHIFT 32      /* counter occupies
                                 high order bits */
#define POINTER_MASK 0xffffffff  /* pointer occupies
                                    low order bits */
#define GET_COUNTER(start) (start) >> COUNTER_SHIFT
#define GET_POINTER(start) (start) & POINTER_MASK
#define MAKE_START(ctr,ptr) ((ctr) << COUNTER_SHIFT) | (ptr)
block_t *block = ... /* pointer to block header */
/* read double-word value to be replaced */
DWORD oldStart = block->start;
/* extract old counter value */
int counter = GET_COUNTER(oldStart);
/* extract old locator address */
locator_t *oldLocPtr = GET_POINTER(oldStart);
/*allocate new locator */
locator_t *newLocPtr = malloc(sizeof(locator_t));
/*initialize new locator */
...
/* increment counter & put in left word, pointer
   in right word */
DWORD newStart = MAKE_START(counter + 1, newLocPtr);
if (CAS(&block->start, oldStart, newStart) {
    /* update succeeded ... */
} else {
    /* update failed ... */
}
```

Because the counter and the pointer to the locator must be read and updated atomically, this solution needs a CAS that operates on double-word locations (or more precisely, a location large enough to hold a pointer and a safe counter). If the system provides only single-word CAS operations, we can circumvent this problem by allocating the locators within a contiguous region of memory beginning at a known memory address, and replacing the pointer in the start field with the locator's displacement within this region. This displacement is smaller than an address, and a single word should accommodate both a safe counter and the displacement. This solution requires us to preallocate space for the locators, but it is possible to grow this region dynamically if we exhaust it.

Memory Management

We now address the problem of reusing the memory structures employed by our algorithm. Although our algorithm is compatible with a variety of memory management techniques, we describe here several techniques that seem particularly well-suited. To simplify our presentation, we assume for the rest of the paper that each thread can have at most one active transaction at a time; it would be straightforward for one skilled in the art to remove this restriction given the descriptions here.

We address the issue of how to reuse memory structures such as locators, data blocks, and transaction descriptors. We do not discuss how they can be reclaimed (i.e., freed to the operating system). However, techniques, such as described in co-pending, commonly-owned U.S. patent application Ser. No. 10/340,156, filed Jan. 10, 2003, entitled "VALUE RECYCLING FACILITY FOR MULTITHREADED COMPUTATIONS" and naming Mark S. Moir, Victor Luchangco and Maurice Herlihy as inventors, may be employed if desired.

Locators

In a system of n threads and m logical blocks, we show how to reuse locators from a pool of n+m locators. If n and m are not known in advance, this pool can be designed to grow dynamically when it is exhausted. We assume the indirection described in the previous section: the locator field in the block_t structure is a pointer (or displacement) to a locator structure. The current locator for a logical block is the one indicated in the block_t structure for that logical block.

At any time, each locator has an owner, which can be either a thread or a logical block. Each logical block owns one locator, its current locator. Each thread also owns one locator, which it will use the next time it opens a logical block.

A thread t that owns a locator l opens a logical block b with current locator l' as follows: The thread t initializes l to the desired value (as described in previous sections), and uses a CAS operation to attempt to install l as the current locator for b. If the CAS operation succeeds, then t acquires ownership of l' from b and relinquishes ownership of l to b. If the CAS fails, then locator ownership remains unchanged.

Data Blocks

For ease of exposition, we assume for now that data blocks have uniform size, and that there is a fixed bound K on the number of logical blocks opened by any transaction. In a system with n threads and m logical blocks, we show how to reuse data blocks from a pool of at most n*K+m data blocks. Again, these parameters do not need to be known in advance: data blocks can be allocated as needed to populate the pools; we assume for now that K is known, and discuss later how to eliminate this assumption.

Data block reuse is also organized around a notion of ownership, but not in the same way as for locators. Like locators, a data block is owned either by a thread or by a logical block. A logical block owns one data block, its current data block. A thread owns K data blocks; at any point in time, each of these blocks is either being using as a tentative data blocks for a transaction, or is in a pool, available for such use. When a thread opens a logical block, it allocates its tentative block d from its pool. Unlike for locators, the ownership of a data block does not change at this point. Instead, data block ownership changes on transaction commit.

Suppose a transaction by thread t opens logical blocks $b_1, \ldots, b_k, k \leq K$, where $b_1, \ldots, b_k$ respectively own data blocks $d_1, \ldots, d_k$, and suppose that t uses $d'_1, \ldots, d'_k$ (owned by t) as tentative data blocks for $b_1, \ldots, b_k$ respectively. If t successfully commits the transaction, then t acquires ownership of $d_1, \ldots, d_k$ from logical blocks $b_1, \ldots, b_k$ respectively, and relinquishes ownership of $d'_1, \ldots, d'_k$ to $b_1, \ldots, b_k$ respectively. If the transaction for thread t aborts, then no data blocks change ownership. In either case, all data blocks owned by t are returned to its pool of available data blocks, to be reused in t's next transaction.

Recoverable Set

We now describe a simple recoverable set data structure that can be used to efficiently manage ownership of data blocks. This data structure maintains a set of data blocks so that we can tentatively remove some data blocks and tentatively add others. Later on, we can undo these operations, or make them permanent. Recoverable sets are not shared among concurrent threads, so there are no synchronization issues.

For simplicity, we assume for now an upper bound K on the number of blocks opened by a transaction. Consider the standard FIFO queue implementation employing a circular array of size 2K with a head index that indicates the next element to be removed from the array, and a tail index that indicates the next empty array slot. Augment this implementation with additional oldHead and oldTail index fields. Initially, all index fields are zero.

Tentative insert and remove operations modify the Head and Tail indexes and array locations as in the usual FIFO enqueue and dequeue operations. To make tentative changes permanent, we set oldHead equal to head and oldTail equal to tail. To discard tentative changes, we do the opposite. Each of these operations requires constant time.

Because the array has size 2K, tentative inserts never overwrite permanent values, and tentative removes never remove a tentative value. If K is not known in advance, it can be estimated, and it is straightforward to detect overflows and grow the array dynamically.

Multiple Block Sizes

So far, we have assumed all data blocks to have uniform size. In applications where data blocks may have different sizes, it is useful to assign each thread several recoverable sets, one for each anticipated block size. In a some embodiments, data block sizes would be rounded up to the nearest power of two. Each thread keeps a distinct recoverable set for each data block size within an anticipated range.

Transaction Descriptors

As described above, whenever a thread starts a new transaction, it allocates a transaction descriptor that holds the current status of that transaction. A thread commits its transaction by applying a CAS to change the status field of the transaction's descriptor from ACTIVE_CODE to COMMIT_CODE. To abort a transaction of another thread, a thread applies a CAS operation to attempt to change the status field of that transaction's descriptor from ACTIVE_CODE to ABORT_CODE.

We now describe one way to reuse transaction descriptors. Recall that each locator has a pointer to the transaction descriptor for the transaction that installed that locator (i.e., the transaction whose tm_open( ) operation stored a pointer to that locator in some block header using CAS). Any thread attempting to interpret that locator must examine the associated transaction descriptor to determine whether the transaction that installed the locator is committed, aborted or active. If the transaction descriptor is reused, then care must be taken to ensure that the thread examining a locator does not examine the transaction descriptor for the wrong transaction.

Suppose thread t completes a transaction with transaction descriptor T, installing locators $l_1, \ldots, l_k$. Before we can recycle T, we must "migrate" the status information for T (that is, whether it committed or aborted) from T to the locators $l_1, \ldots, l_k$. Recall that the status of a transaction is indicated by a simple code:

```
typedef enum {
    ABORT_CODE, ACTIVE_CODE, COMMIT_CODE
} statusCode_t;
```

We replace the trans field of each locator with a status field, which can have one of two kinds of values: a pointer to a transaction descriptor as before, or a statusCode_t indicating the outcome of the transaction. We refer to the latter as an immediate value.

```
/* An immediate commit/abort code or a pointer to
/* controlling transaction */
typedef union status_u {
    statusCode_t statusCode; // immediate code
    trans_t *trans; // indirect transaction pointer
} status_t;
typedef struct locator_s {
    status_t status; // committed, aborted, or pointer to trans
    void *oldData; // prior committed value
    void *newData; // new or tentative value
} locator_t;
```

Each transaction descriptor T keeps track of the set of locators $l_1, \ldots, l_k$ installed on behalf of that transaction.

Before a transaction can reuse T, it must first iterate through $l_1, \ldots, l_k$ and ensure that each status field has an immediate value in order to ensure that another transaction does not subsequently read an incorrect status for the transaction that previously used T. One way to accomplish this goal is to use CAS to replace any locator status field containing the address of T with a code indicating whether T committed or aborted. (It is important to use CAS to avoid overwriting a pointer to a different transaction descriptor in the case that the locator has already been reused.) In the following code fragment, we assume that the transaction descriptor includes an lset field containing the set of locators installed by the transaction. A locator is removed from the set by lset_get( . . . ).

```
/* clean up locators before reusing the transaction descriptor
 */
void trans_cleanup(trans_t *self) {
    statusCode_t code = self->statusCode;
    locator_t *locPtr = lset_get(&self->lset);
    while (locPtr != NULL) {
        if (locPtr->status.trans == self) {
            CAS (&locPtr->status.statusCode, self, statusCode);
        }
        locPtr = lset_get(&self->lset);
    }
    self->statusCode = ACTIVE_CODE;
}
```

Numerous optimizations are possible. When a thread t acquires ownership of locator l installed by thread t', t can immediately set the status field of l to any immediate value because any tm_open( ) operation that uses this value to determine the current data block for some logical block will subsequently fail to replace this locator in the block header of the logical block it is opening. Because this is done only by the owner of the locator, it can be done with a simply store, rather than requiring a CAS. This relieves t' of the need to do a CAS to remove the transaction descriptor pointer. This approach is beneficial in systems where CAS is expensive.

One can extend this optimization further by having each thread rotate through a pool of transaction descriptors. This pool induces a delay between when a transaction commits and when its transaction descriptor is reused. This delay increases the chances that another thread will replace the status fields of locators (using a store as described above), thereby reducing the number of expensive CAS operations.

Read-Only Access

Under some circumstances, it is advantageous to permit concurrent transactions to read blocks in common without interfering with one another. To support this functionality, we add a new operation:

Void *tm_read(trans_t *t, blockid block);

Like tm_open( ), tm_read( ) returns a pointer to a copy of the block, and the caller can read from or write to this copy. The tm_read( ) operation differs from tm_open( ) in two important respects:

1. All changes made to the block through the pointer returned by tm_read( ) will be discarded when the transaction commits or aborts.
2. If transactions t and t' concurrently apply tm_read( ) to block b, then neither one necessarily causes the other to abort.

For brevity, we say transaction t reads block b if it applies tm_read( ) to b.

The consistency guarantee for tm_read( ) is the same as for tm_open( ): the pointer returned points to a data block containing some previously committed value of the block. Some implementations may additionally provide the programmer with a more efficient version of tm_read( ) that does not make this guarantee. As before, reading different blocks in the same transaction may yield inconsistent values, but any transaction that observes such inconsistencies is guaranteed not to commit successfully. Also as before, pointers returned by tm_read( ) should be used only within the transaction in which tm_read( ) was invoked.

We now illustrate some particular structures and techniques to implement read-only access. Of course, as before, based on the description herein, persons of ordinary skill in the art will appreciate a variety of suitable alternatives, and while the use of particular structures and techniques, including the use of a thread-local read-only table, provides a useful descriptive context, it will be understood that these structures and techniques are merely illustrative of a particular adaptation of our techniques. Therefore, in view of the foregoing and without limitation, we describe an illustrative implementation of read-only access.

Just as for tm_open( ), the transaction opens a block b by allocating a data block d, and acquiring a pointer to d', the data block holding the most recently committed version of b. Instead of installing a new version, however, the transaction records the read in the following structure:

```
//
// individual read-only record
//
typedef struct readonly_s {
    block_t *block; // block read
    DWORD start;   // value read
} readonly_t;
```

This structure has two fields: block is the block id of the block opened, and start is the value of the block's start field at the time the block is opened. A transaction's readonly_t structures are kept in a readset_t data structure associated with the thread. A readset_t is a set of readonly_t structures; in the examples below, we assume that it is implemented as an array data of pointers to readonly_t, and a count top of elements in the array.

Before a transaction can commit, it must ensure that none of the blocks it has read has been modified, a process called validation. The transaction validates each block read by checking that each recorded start value matches that block's current start value. For example, the following procedure returns true if and only if every read-only block can be validated.

```
// validate all read-only blocks
bool readset_validateAll(readset_t *self) {
    int i;
    for (i = 0; i < top; i++) {
        if (self->data[i].block->start != self->data[i].start)
            return FALSE;
    }
    return TRUE;
}
```

Finally, support for read-only access requires modest changes to memory management. Recall that each time a transaction opens a block, it tentatively allocates a data block d of the appropriate size, and copies the block's current data block d' into d. If that transaction commits, it relinquishes ownership of d to the block, and acquires ownership of d' from the block. If that transaction aborts, block ownerships are unchanged. By contrast, each time t reads a block, each data block d returned by tm_read( ) is returned to the thread's pool, whether or not the transaction commits.

There are many ways to accomplish this functionality, but one of the simplest is to split the thread's pool of free data blocks into two recoverable sets, rset and wset. Blocks returned by tm_open( ) are tentatively allocated from wset, and blocks returned by tm_read( ) from rset. Exactly as before, if a transaction successfully commits, it makes the changes to wset permanent, and otherwise it undoes them. Either way, it undoes the operations applied to rset to prepare for reusing the same data blocks for subsequent read-only accesses.

To summarize, support for read-only access adds the following new fields to each thread.

```
//
// per-thread data structures
//
typedef struct mthread_s {
    ...
    readset_t readset;              // read-only blocks in the current
                                    // transaction
    ...
    // memory management
    recover_t rset[TM_BLOCK_RANGE];  // read-only data blocks
                                     // sets, indexed by size
    recover_t wset[TM_BLOCK_RANGE];  // written data blocks
                                     // sets, indexed by size
    ...
} mthread_t;
```

Changing Access Modes

Consider a transaction t that uses tm_read( ) to navigate through a structure until it locates a block b, and then applies tm_open( ) to b with the intent to modify b. Care must be taken to ensure that the call to tm_open( ) does not cause t to abort when it tries to validate its earlier read of b.

There are several ways to accomplish this goal. One way is for tm_open( ) to check t's readset whenever it opens a block. This approach is unattractive, as it makes a common operation less efficient. A second way is to provide a distinct version of tm_open( ) that performs the same check, either though a distinct operation, or by adding a control argument to tm_open( ). It would be the programmer's responsibility to call the proper operation when opening a block.

A third approach is to exploit the safe counter in the start of the block header to detect when an apparent invalidation was caused by the same transaction. The safe counter acts as a version number: each successive locator has a counter value one greater than its predecessor. As before, to validate a read, a committing transaction t first compares the start field of its readonly_t record with the block's current start field. If they match, the read is validated. If they do not match, then suppose the field values are (c, l) and (c', l'). If c'=c+1 and the transaction descriptor of l' matches that of t, then the read is validated. This approach has the advantage that the programmer does not have to keep track of which blocks may have been read, and the common cases require no extra work.

Early Release

A transaction t that has read block b will be aborted if another transaction t' opens block b before t commits. This danger can be reduced if t is allowed to release b, meaning that any subsequent accesses to b will not affect whether t commits or aborts.

A transaction t releases a block b in the following steps.

1. The transaction validates b, ensuring that no other transaction has opened it since t read b.
2. If the validation fails, then t is marked as aborted.
3. If the validation succeeds, then b is removed from t's readonly_t set, ensuring that b will not be validated when t commits.

Example code follows:

```
// validate this block and remove from readset
// REQUIRES block is in readset
bool readset_validate(readset_t *self, block_t *block) {
    int i;
    bool ok;
    for (i = 0; i < self->size; i++)
        if (self->data[i].block == block)
            break;
    if (self->data[i].block->start != self->data[i].start) {
        // remove this block from self
        ...
        return TRUE;
    } else {
        return FALSE;
    }
}
```

Contention Management

Despite our advocacy of obstruction-free synchronization, we do not expect progress to take care of itself. On the contrary, we have found that explicit measures are often necessary to avoid starvation. Obstruction-free synchronization encourages a clean distinction between the obstruction-free mechanisms that ensure correctness (such as conflict detection and recovery) and additional mechanisms that ensure progress (such as adaptive backoff or queuing).

In our transactional memory implementation, progress is the responsibility of the contention manager. Each thread has its own contention manager instance, which it consults to decide whether to force a conflicting thread to abort. In addition, contention managers of different threads may consult one another to compare priorities and other attributes.

A correctness requirement for contention managers is simple and quite weak. Informally, any active transaction that asks sufficiently many times must eventually get permission to abort a conflicting transaction. More precisely, every call to a contention manager method eventually returns (unless the invoking thread stops taking steps for some reason), and every transaction that repeatedly requests to abort another transaction is eventually granted permission to do so. This requirement is needed to preserve obstruction-freedom: A transaction T that is forever denied permission to abort a conflicting transaction will never commit even if it runs by itself. If the conflicting transaction is also continually requesting permission to abort T, and incorrectly being denied this permission, the situation is akin to deadlock. Conversely, if T is eventually allowed to abort any conflicting transaction, then T will eventually commit if it runs by itself for long enough.

The correctness requirement for contention managers does not guarantee progress in the presence of conflicts. Whether a particular contention manager should provide such a guarantee—and under what assumptions and system models it should do so—is a policy decision that may depend on applications, environments, and other factors. The problem of avoiding livelock is thus delegated to the contention manager.

Rather than mandate a specific contention-management policy, we define a ContentionManager interface that every contention manager must implement. This interface specifies two kinds of methods, notification methods and feedback methods, which are invoked by our DSTM implementation.

Notification methods inform a contention manager of relevant events in the DSTM; they do not return any value. For example, a commitTransactionSucceeded( ) method can be invoked whenever a transaction commits successfully, and a commitTransactionFailed( ) method can be invoked whenever an attempt to commit a transaction fails. Some notification methods correspond to events internal to our DSTM implementation. For example, a openReadAttempt( ) method is called to notify a contention manager before any attempt to open in READ mode an object that is not already open; similarly, a openWriteAttempt( ) method is called before any attempt to open an object in WRITE mode.

Feedback methods are called by the DSTM to determine what action should be taken in various circumstances. For example, a feedback method, shouldAbort( ) can be invoked when the DSTM detects a conflicting transaction during an attempt to open an object. A shouldAbort( ) method is passed the object being opened and the manager of the conflicting transaction, and it returns a boolean indicating whether to try to abort the conflicting transaction.

Obstruction-Free Data Structure

We next illustrate the power of our obstruction-free approach in the context of an illustrative concurrent shared (or sharable) data structure. In particular, we have implemented a nonblocking double-ended queue (i.e., a deque) in which we provide for separate (or separable) contention management. Deques are more formally defined below. However, informally, deques generalize FIFO queues and LIFO stacks by supporting a sequence of values and operations for adding (pushing) a value to or removing (popping) a value from either end. Thus, implementing a shared deque combines the intricacies of implementing queues and stacks. Using our techniques, we believe that we have achieved the first fully-functional, single-target synchronization based (e.g., CAS-based), non-blocking deque implementation in which opposing end operations do not always interfere.

Because obstruction-freedom does not guarantee progress in the presence of contention, we need to provide some mechanism to reduce the contention so that progress is achieved. However, lock-free and wait-free implementations typically also require such mechanisms to get satisfactory performance. We can use these same or similar mechanisms with obstruction-free implementations, as we discuss below. Because obstruction-freedom guarantees safety regardless of the contention, we can change mechanisms, even dynamically, without changing the underlying nonblocking implementation.

One straightforward technique to reduce contention is for operations to "back off" when they encounter interference by waiting for some time before retrying. Various choices are possible for how long to wait. For example, randomized exponential backoff is one scheme that is effective in many contexts. Other approaches to reducing contention include queuing and time stamping approaches, in which threads agree amongst themselves to "wait" for each other to finish. While a simplistic applications of these ideas could give rise to some of the same problems that the use of locks does, we have much more freedom in designing sophisticated approaches for contention control than when using locks, because correctness is not jeopardized by interrupting an operation at any time and allowing another operation to continue execution.

In fact, it is possible to design contention management mechanisms that guarantee progress to every operation that takes enough steps, provided the system satisfies some very weak (and reasonable) assumptions. Thus, the strong progress properties of wait-free implementations can be achieved in practice by combining obstruction-free implementations with appropriate contention managers. In scenarios in which contention between operations is rare, we will benefit from the simple and efficient obstruction-free designs; the more heavy-weight contention resolution mechanisms will rarely be invoked. In contrast, in most lock-free and wait-free implementations, the mechanisms that are used to ensure the respective progress properties impose significant overhead even in the absence of contention.

In some contexts, explicit contention reduction mechanisms may even be unnecessary. For example, in a uniprocessor where threads are scheduled by time slice, relatively short obstruction-free operations will be guaranteed to run alone for long enough to complete. Similarly, in priority-scheduled uniprocessors, an operation runs in isolation unless it is preempted by a higher priority operation.

A Double-Ended Queue (Deque)

A deque object S is a concurrent shared object, that in an exemplary realization is created by an operation of a constructor operation, e.g., make_deque( ), and which allows each processor $P_i$, $0 \le i \le n-1$, of a concurrent system to perform the following types of operations on S: push_right$_i$(v), push_left$_i$(v), pop_right$_i$( ), and pop_left$_i$( ). Each push operation has an input, v, where v is selected from a range of values. Each pop operation returns an output from the range of values. Push operations on a full deque object and pop operations on an empty deque object return appropriate indications. Based on the description herein, persons of ordinary skill in the art will recognize that subscript notations are often clear from the context or unimportant. Accordingly, in the interest of clarity, subscripts may be omitted in some of the description that follows.

A concurrent implementation of a deque object is one that is linearizable to a standard sequential deque. This sequential deque can be specified using a state-machine representation that captures all of its allowable sequential histories. These sequential histories include all sequences of push and pop operations induced by the state machine representation, but do not include the actual states of the machine. In the following description, we abuse notation slightly for the sake of clarity.

The state of a deque is a sequence of items $S=\langle v_0, \ldots, v_k \rangle$ from the range of values, having cardinality $0 \le |S| \le \text{max\_length\_S}$. The deque is initially in the empty state (following invocation of make_deque( )), that is, has cardinality 0, and is said to have reached a full state if its cardinality is max_length_S.

The four possible push and pop operations, executed sequentially, induce the following state transitions of the sequence $S=\langle v_0, \ldots, v_k \rangle$, with appropriate returned values:

push_right($v_{new}$) if S is not full, sets S to be the sequence $S=\langle v_0, \ldots, v_k, v_{new} \rangle$ push_left($v_{new}$) if S is not full, sets S to be the sequence $S=\langle v_{new}, v_0, \ldots, v_k \rangle$ pop_right( ) if S is not empty, sets S to be the sequence $S=\langle v_0, \ldots, v_{k-1} \rangle$ and returns the item, $v_k$.

pop_left( ) if S is not empty, sets S to be the sequence $S=\langle v_1, \ldots, v_k \rangle$ and returns the item $v_0$.

For example, starting with an empty deque state, $S=\langle \ \rangle$, the following sequence of operations and corresponding transitions can occur. A push_right(1) changes the deque state to $S=\langle 1 \rangle$. A push_left(2) subsequently changes the deque state to $S=\langle 2,1 \rangle$. A subsequent push_right(3) changes the deque state to $S=\langle 2,1,3 \rangle$. Finally, a subsequent pop_right( ) changes the deque state to $S=\langle 2,1 \rangle$ and returns the value, 3. In some implementations, return values may be employed to indicate success or failure.

Obstruction-Free Deque Implementation

We present an array-based, obstruction-free deque implementation. Our first algorithm is extremely simple, and serves to illustrate our technique. However, the first illustration is not entirely complete in the sense that it does not fully generalize queues. In particular, if we only push on one end and pop from the other, we will exhaust the space in the illustrated array and will not be able to push any more items. Later, we show how to extend the algorithm to "wrap around" in the array in order to overcome this problem.

The declarations that follow define a simple array-based data structure that encodes our deque.

type element=record val: valtype; ctr: int end A: array [0 . . . MAX+1] of element initially there is some k in [0,MAX] such that A[i]=<LN,0> for all i in [0,k] and A[i]=<RN,0> for all i in [k+1,MAX+1].

In our implementation, we assume the existence of two special "null" values LN and RN (left null and right null) that are never pushed onto the deque. We use the array A to store the current state of the deque. The deque can contain up to MAX values, and the array is of size MAX+2 to accommodate a left-most location that always contains LN and a right-most location that always contains RN. These extra locations are not strictly necessary, but they simplify the code.

Figure 5:
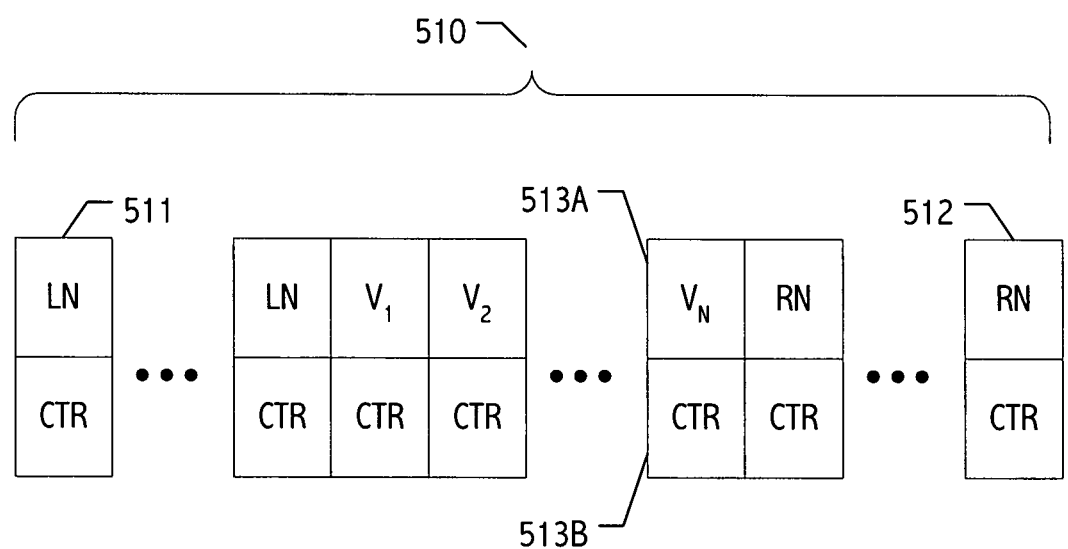
FIG. 5 depicts an illustrative state of an array-based encoding of a shared data structure that serves as a context for explaining some data structure exploitations of techniques in accordance with the present invention.

FIG. 5 illustrates such an array 510, where values $v_1$, $v_2$, . . . $v_n$ of a represented deque are encoded in elements of the array. An LN value is stored in a leftmost array element 511 and in each other element to the left of $v_1$. An RN value is stored in a rightmost array element 512 and in each other element to the right of $v_n$. Each element of the array includes two fields, e.g., a val field such as 513A and a ctr field such as 513B. Operations on the encoded values and on fields of the elements will be understood with reference to FIG. 5 and to the exemplary code herein.

Our algorithm maintains the invariant that the sequence of values in A[0]. val . . . A[MAX+1]. val always includes of at least one LN, followed by zero or more data values, followed by at least one RN. The array can be initialized any way that satisfies this invariant. To simplify our presentation, we assume the existence of a function oracle( ), which accepts a parameter left or right and returns an array index. The intuition is that this function attempts to return the index of the leftmost RN value in A when invoked with the parameter right, and attempts to return the index of the rightmost LN value in A when invoked with the parameter left. The algorithm is linearizable even if oracle can be incorrect. We assume that oracle( ) always returns a value between 1 and MAX+1, inclusive, when invoked with the parameter right and always returns a value between 0 and MAX, inclusive, when invoked with the parameter left. Clearly, it is trivial to implement a function that satisfies this property. Stronger properties of the oracle are required to prove obstruction-freedom; we discuss these properties and how they can be achieved later.

As explained in more detail below, we employ version numbers to each value in order to prevent concurrent operations that potentially interfere from doing so. The version numbers are updated atomically with the values using a compare-and-swap (CAS) instruction. In general, a CAS(a, e, n) operation or instruction takes three parameters: an address a, an expected value e, and a new value n. If the value currently stored at address a matches the expected value e, then the CAS stores the new value n at address a and returns true; we say that the CAS succeeds in this case. Otherwise, the CAS returns false and does not modify the memory. We say that the CAS fails in this case. As usual with version numbers, we assume that sufficient bits are allocated for the version numbers to ensure that they cannot "wrap around" during the short interval in which one process executes a single iteration of a short loop in our algorithm.

A reason our obstruction-free deque implementation is so simple, and the reason we believe obstruction-free implementations in general will be significantly simpler than their lock-free and wait-free counterparts, is that there is no progress requirement when interference is detected. Thus, provided we maintain basic invariants, we can simply retry when we detect interference. In the illustrated deque implementation, data values are changed at linearization points of successful push and pop operations. Specific examples of linearization points are included in the description that follows. To detect when concurrent operations interfere with each other, we increment version numbers of adjacent locations (without changing their associated data values). As a result of this technique, two concurrent operations can each cause the other to retry: this explains why our implementation is so simple, and also why it is not lock-free.

To make this idea more concrete, we describe our implementation in terms of right-side push and pop operations (rightpush( ) and rightpop( )) that appear below. Left-side operations are symmetric with the right-side ones. As a result, they are not separately described.

```
rightpush(v)                                    // v is not RN or LN
RH0:  while (true) {
RH1:     k := oracle(right);                    // find index of leftmost RN
RH2:     prev := A[k–1];                        // read (supposed) rightmost non-RN
                                                // value
RH3:     cur := A[k];                           // read (supposed) leftmost RN value
RH4:     if (prev.val != RN and cur.val = RN) { // oracle is right
RH5:        if (k = MAX+1) return "full";       // A[MAX] != RN
RH6:        if CAS(&A[k–1],prev,<prev.val,prev.ctr+1>)  // try to
                                                        // bump up
                                                        // prev.ctr
RH7:           if CAS(&A[k],cur,<v,cur.ctr+1>)  // try to push new
                                                // value
RH8:              return "ok";   // it worked!
         }
    }
}
```

Figure 6:
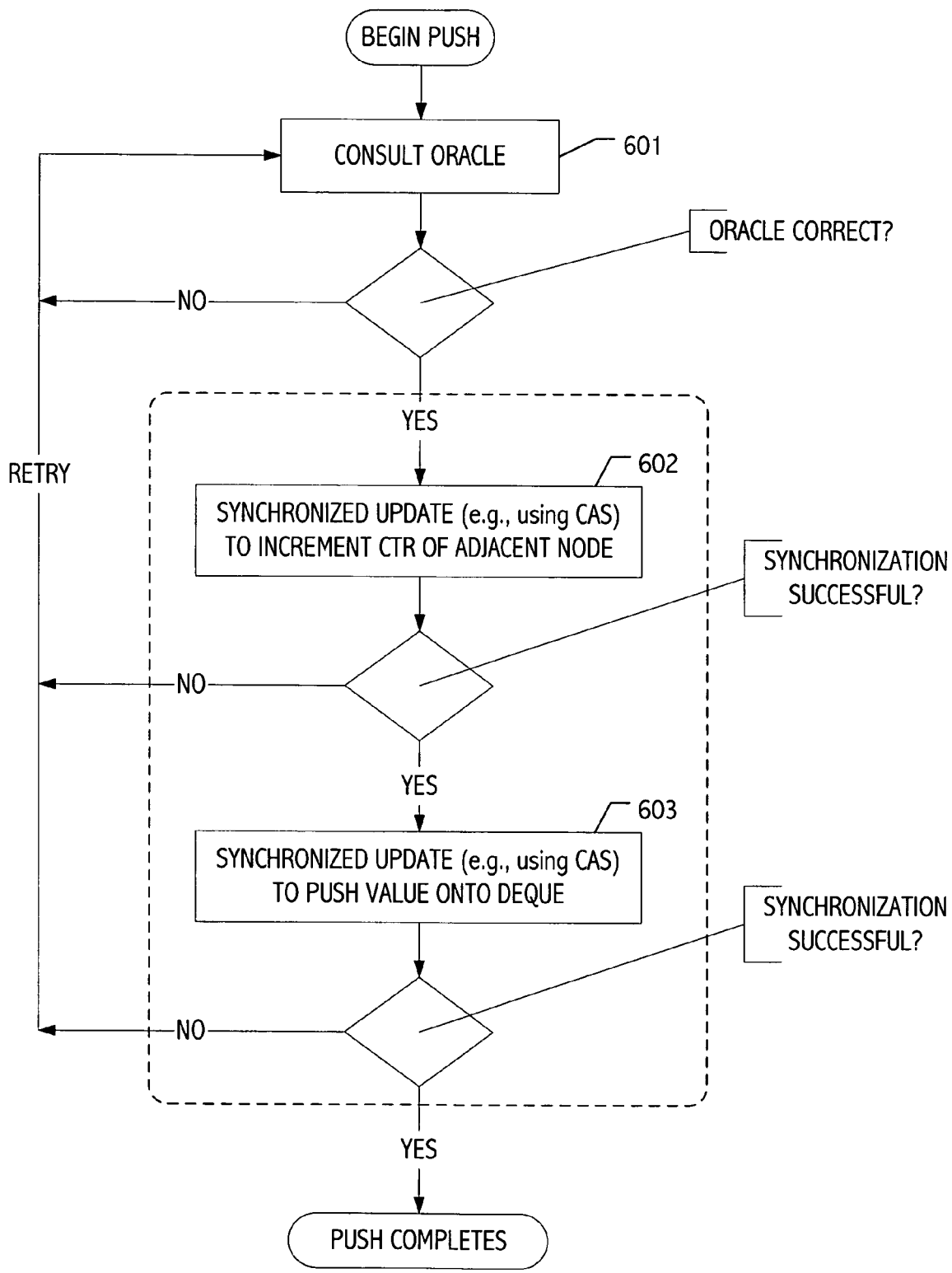
FIG. 6 illustrates a flow for an illustrative obstruction-free push operation in accordance with some techniques of the present invention.

FIG. 6 highlights the simplicity of our implementation. After consulting (601) an oracle (described below), the rightpush( ) implementation employs a pair of single-target synchronizations to increment (602) the ctr field of an adjacent element and, if successful, to push (603) a value onto the deque. Interference with a competing operation simply results in a retry.

The rightpop( ) operation is also quite straightforward and will be understood with reference to the following code.

```
rightpop( )
RP0:  while (true) { //    keep trying till return val or empty
RP1:     k := oracle(right);   // find index of leftmost RN
RP2:     cur := A[k–1];        // read (supposed) value to be popped
RP3:     next := A[k];         // read (supposed) leftmost RN
RP4:     if (cur.val != RN and next.val = RN) { // oracle is right
RP5:        if (cur.val = LN and A[k–1] = cur); // adjacent LN and RN
RP6:           return "empty"
RP7:        if CAS(&A[k],next,<RN,next.ctr+1>)   // try to bump up
                                                 // next.ctr
RP8:           if CAS(&A[k–1],cur,<RN,cur.ctr+1>) // try to remove
value
RP9:              return cur.val    // it worked; return removed value
         }
    }
```

The basic idea behind our algorithm is that a rightpush(v) operation changes the leftmost RN value to v, and a rightpop( ) operation changes the rightmost data value to RN and returns that value. Each rightpush(v) operation that successfully pushes a data value (as opposed to returning "full")

is linearized to the point at which it changes an RN value to v. Similarly, each rightpop( ) operation that returns a value v (as opposed to returning "empty") is linearized to the point at which it changes the val field of some array location from v to RN. Furthermore, the val field of an array location does not change unless an operation is linearized as discussed above. The rightpush( ) operation returns "full" only if it observes a non-RN value in A[MAX].val. Given these observations, it is easy to see that our algorithm is linearizable if we believe the following three claims (and their symmetric counterparts):

At the moment that line RH7 of a rightpush(v) operation successfully changes A[k].val for some k from RN to v, A[k−1].val contains a non-RN value (i.e., either a data value or LN).

At the moment that line RP8 of the rightpop( ) operation successfully changes A[k−1].val for some k from some value v to RN, A[k].val contains RN.

If a rightpop( ) operation returns "empty", then at the moment it executed line RP3,A[k].val=RN and A[k−1].val=LN held for some k.

Using the above observations and claims, a proof by simulation to an abstract deque in an array of size MAX is straightforward. Below we briefly explain the synchronization techniques that we use to ensure that the above claims hold. The techniques all exploit the version numbers in the array locations.

The empty case (the third claim above) is the simplest: rightpop( ) returns "empty" only if it reads the same value from A[k−1] at lines RP2 and RP5. Because every CAS that modifies an array location increments that location's version number, it follows that A [k−1] maintained the same value throughout this interval (recall our assumption about version numbers not wrapping around). Thus, in particular, A[k−1].val contained LN at the moment that line RP3 read RN in A[k].val.

The techniques used to guarantee the other two claims are essentially the same, so we explain only the first one. The basic idea is to check that the neighboring location (i.e., A[k−1]) contains the appropriate value (line RH2; see also line RH4), and to increment its version number (without changing its value; line RH6) between reading the location to be changed (line RH3) and attempting to change it (line RH7). If any of the attempts to change a location fail, then we have encountered some interference, so we can simply restart. Otherwise, it can be shown easily that the neighboring location's value did not change to RN between the time it was read (line RH2) and the time the location to be changed is changed (line RH7). The reason is that a rightpop( ) operation—the only operation that changes a location's value to RN—that was attempting to change the neighboring location's value to RN would increment the version number of the location the rightpush( ) operation is trying to modify, so one of the operations would cause the other to retry.

Oracle Implementations

The requirements for the oracle( ) function assumed in the previous section are quite weak, and therefore a number of implementations are possible. We first describe the requirements, and then outline some possible implementations. For linearizability, the only requirement on the oracle is that it always returns an index from the appropriate range depending on its parameter as stated earlier; satisfying this requirement is trivial. However, to guarantee obstruction-freedom, we require that the oracle is eventually accurate if repeatedly invoked in the absence of interference. By "accurate": we mean that it returns the index of the leftmost RN when invoked with right, and the index of the rightmost LN when invoked with left. It is easy to see that if any of the operations executes an entire loop iteration in isolation, and the oracle function returns the index specified above, then the operation completes in that iteration. Because the oracle has no obligation (except for the trivial range constraint) in the case that it encounters interference, we have plenty of flexibility in implementing it. One simple and correct implementation is to search the array linearly from one end looking for the appropriate value. Depending on the maximum deque size, however, this solution might be very inefficient. One can imagine several alternatives to avoid this exhaustive search. For example, we can maintain "hints" for the left and right ends, with the goal of keeping the hints approximately accurate; then we could read those hints, and search from the indicated array position (we'll always be able to tell which direction to search using the values we read). Because these hints do not have to be perfectly accurate at all times, we can choose various ways to update them. For example, if we use CAS to update the hints, we can prevent slow processes from writing out-of-date values to hints, and therefore keep hints almost accurate all the time. It may also be useful to loosen the accuracy of the hints, thereby synchronizing on them less often. In particular, we might consider only updating the hint when it is pointing to a location that resides in a different cache line than the location that really contains the leftmost RN for example, as in this case the cost of the inaccurate hint would be much higher.

Extension to Circular Arrays

Figure 7:
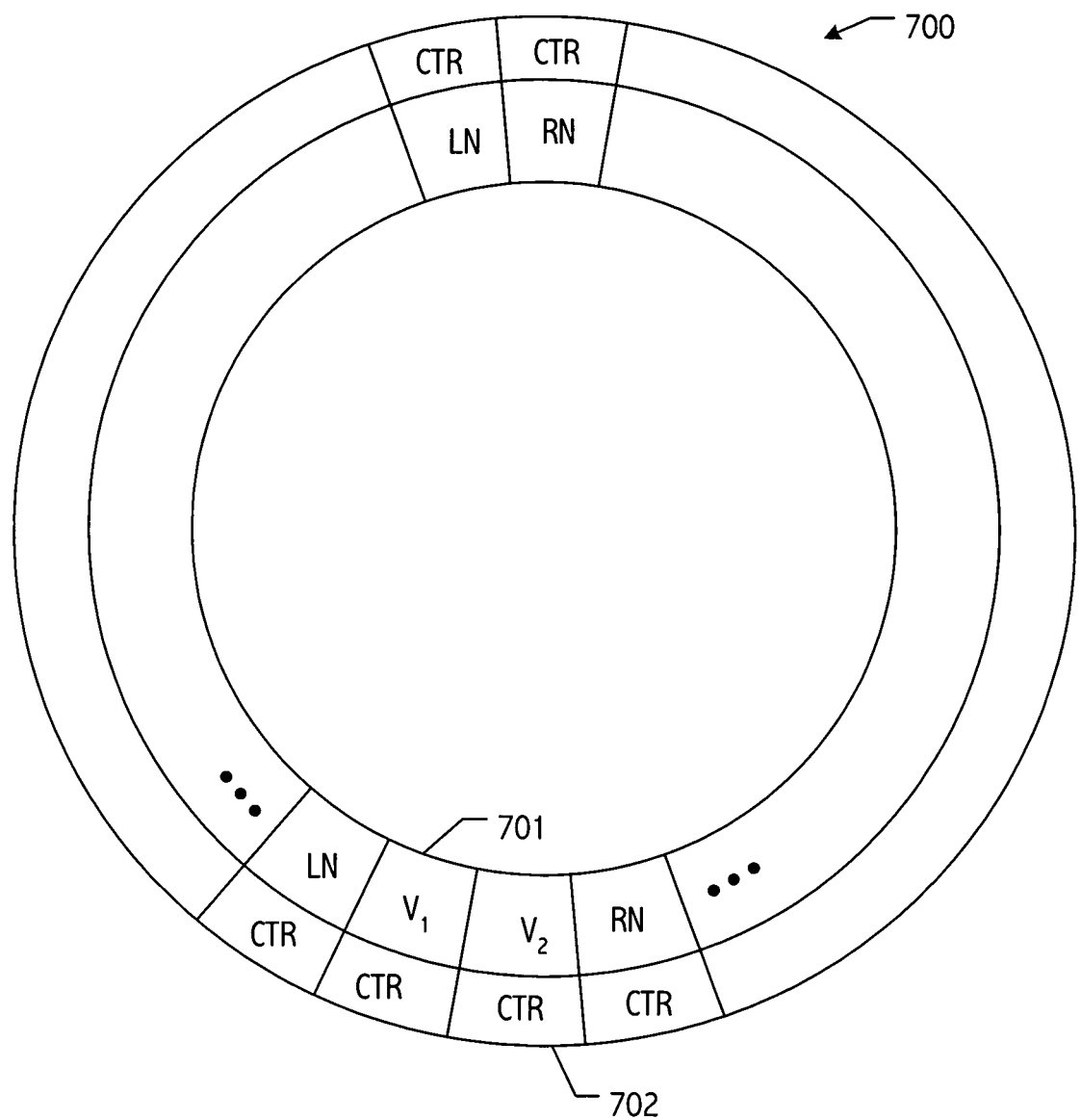
FIG. 7 depicts an illustrative state of a circular array-based encoding of a shared data structure encoding for an exemplary non-blocking deque implemented in accordance with some embodiments of the present invention.

In this section, we show how to extend the algorithm in the previous section to allow the deque to "wrap around" the array, so that the array appears to be circular. FIG. 7 illustrates a two-value deque state encoded in a suitable circular array (700), where elements 701 and 702 encode values $v_1$ and $v_2$, respectively. In other words, A[0] is "immediately to the right" of A[MAX+1]. As before, we maintain at least two null entries in the array: we use the array A[0 ... MAX+1] for a deque with at most MAX elements. The array can be initialized arbitrarily provided it satisfies the main invariant for the algorithm, stated below. One option is to use the initial conditions for the algorithm in the previous section.

We now describe the new aspects of the algorithm. Code for the right-side operations of the wrap-around deque implementation are shown below. As before, the left-side operations are symmetric, and we do not discuss them further except as they interact with the right-side operations. All arithmetic on array indices is done modulo MAX+2.

```
rightpush(v)                                    // !(v in {LN,RN,DN})
RH0:    while (true) {
RH1:        k,prev,cur := rightcheckedoracle( );  // cur.val = RN and
                                                  // prev.val != RN
RH2:        next := A[k+1];
RH3:        if (next.val = RN)
RH4:            if CAS(&A[k−1], prev, <prev.val, prev.ctr+1>)
RH5:                if CAS(&A[k], cur, <v, cur.ctr+1>)         // RN -> v
RH6:                    return "ok";
RH7:        if (next.val = LN)
RH8:            if CAS(&A[k], cur, <RN, cur.ctr+1>)
RH9:                CAS(&A[k+1], next, <DN, next.ctr+1>);     // LN -> DN
RH10:       if (next.val = DN) {
RH11:           nextnext := A[k+2];
RH12:           if !(nextnext.val in {RN,LN,DN})
RH13:               if (A[k−1] = prev)
RH14:               if (A[k] = cur) return "full";
RH15:           if (nextnext.val = LN)
RH16:               if CAS(&A[k+2], nextnext, <nextnext.val,nextnext.ctr+1>)
RH17:                   CAS(&A[k+1], next, <RN, next.ctr+1>);   // DN -> RN
        }
    }
rightpop( )
```

-continued

```
RP0:    while (true) {
RP1:        k,cur,next := rightcheckedoracle( );    // next.val = RN and
                                                    // cur.val != RN
RP2:        if (cur.val in {LN,DN} and A[k−1] = cur)    // depends on
                                                       // order of RO2
                                                       & RO3.
RP3:            return "empty";
RP4:        if CAS(&A[k],next,<RN,next.ctr+1>)
RP5:        if CAS(&A[k−1],cur,<RN,cur.ctr+1>)      // v -> RN
RP6:            return cur.val;
        }
```

There are two main differences between this algorithm and the one in the previous section. First, it is more difficult to tell whether the deque is full; we must determine that there are exactly two null entries. Second, rightpush( ) operations may encounter LN values as they "consume" the RN values and wrap around the array (similarly, leftpush( ) operations may encounter RN values). We handle this second problem by enabling a rightpush( ) operation to "convert" LN values into RN values. This conversion uses an extra null value, which we denote DN, for "dummy null". We assume that LN, RN and DN are never pushed onto the deque.

Because the array is circular, the algorithm maintains the following invariants instead of the simpler invariant maintained by the algorithm in the previous section:

All null values are in a contiguous sequence of locations in the array. (Recall that the array is circular, so the sequence can wrap around the array.)

The sequence of null values consists of zero or more RN values, followed by zero or one DN value, followed by zero or more LN values.

There are at least two different types of null values in the sequence of null values.

Thus, there is always at least one LN or DN entry, and at least one RN or DN entry.

Instead of invoking oracle(right) directly, the push and pop operations invoke a new auxiliary procedure, rightcheckedoracle( ). In addition to an array index k, rightcheckedoracle( ) returns left and right, the contents it last saw in A[k−1] and A[k] respectively. It guarantees that right.val=RN and that left.val!=RN. Thus, if rightcheckedoracle( ) runs in isolation, it always returns the correct index, together with contents of the appropriate array entries that prove that the index is correct. If no RN entry exists, then by the third invariant above, there is a DN entry and an LN entry; rightcheckedoracle( ) attempts to convert the DN into an RN before returning.

```
rightcheckedoracle( )
// Returns k,left,right, where left = A[k−1] at some time t,
// and right = A[k] at some time t' > t during the execution,
// with left.val != RN and right.val = RN.
RO0:    while (true) {
RO1:        k := oracle(right);
RO2:        left := A[k−1];                          // order important for
RO3:        right := A[k];                           // check for empty in
RO4:        if (right.val = RN and left.val != RN)   // rightpop correct oracle
RO5:            return k,left,right;
RO6:        if (right.val = DN and !(left.val in {RN,DN}))   // correct
                                                             // oracle, but
                                                             // no RNs
RO7:        if CAS(&A[k−1], left, <left.val,left.ctr+1>)
RO8:            if CAS(&A[k], right, <RN,right.ctr+1>)       // DN -> RN
RO9:                return k,<left.val,left.ctr+1>,<RN,right.ctr+1>;
        }
```

Other than calling rightcheckedoracle( ) instead of oracle (right), which also eliminates the need to read and check the cur and next values again, the only change in the rightpop( ) operation is that, in checking whether the deque is empty, cur.val may be either LN or DN, because there may be no LN entries.

Figure 8:
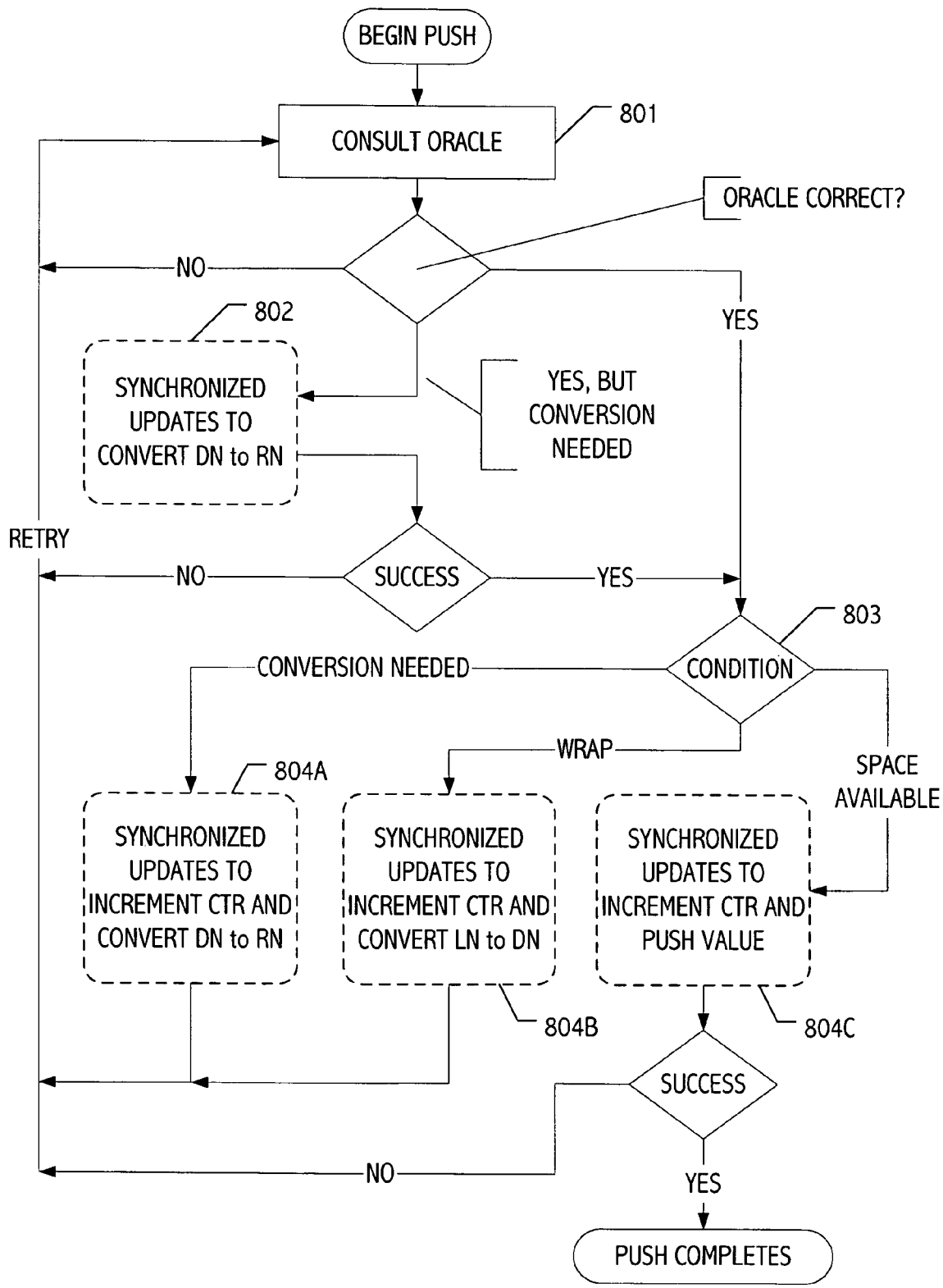
FIG. 8 illustrates a flow for an illustrative obstruction-free push operation on a wraparound deque in accordance with some techniques of the present invention.

FIG. 8 summarizes major flows in the operation of the rightpush( ) and rightcheckedoracle( ) operations. As before, the implementation consults (801) an oracle, though this time, we check for the possibility that (though correct) the oracle returns a location with an adjacent DN value encoding to be converted. If so, the rightpush( ) operation employs a sequence of synchronization operations (at 802) to perform the DN to RN conversion. If successful (or if no DN conversion was required), the rightpush( ) operation attempts (as before) to increment an appropriate ctr field and to update a corresponding value field using a simple sequence of single-target (e.g., CAS-based) synchronization operations. As before, on failure, we simply retry. Though structurally quite similar to the simple example described above, our circular array algorithm does differentiate (at 803) between various conditions (space available, wrap, and DN-to-RN conversion needed) to perform the appropriate value update (e.g., at 804A, 804B or 804C) as part of the synchronization updates.

Because the array is circular, a rightpush( ) operation cannot determine whether the array is full by checking whether the returned index is at the end of the array. Instead, it ensures that there is space in the array by checking that A[k+1]. val=RN. In that case, by the third invariant above, there are at least two null entries other than A[k] (which also contains RN), so the deque is not full. Otherwise, rightpush( ) first attempts to convert A[k] into an RN entry. We discuss how this conversion is accomplished below.

When a rightpush( ) operation finds only one RN entry, it tries to convert the next null entry—we know there is one by the third invariant above—into an RN. If the next null entry is an LN entry, then rightpush( ) first attempts to convert it into a DN entry. When doing this, rightpush( ) checks that cur.val=RN, which ensures there is at most one DN entry, as required by the second invariant above. If the next null entry is a DN entry, rightpush( ) will try to convert it into an RN entry, but only if the entry to the right of the one being converted (the nextnext entry) is an LN entry. In this case, it first increments the version number of the nextnext entry, ensuring the failure of any concurrent leftpush( ) operation trying to push a value into that entry. If the nextnext entry is a deque value, then the rightpush( ) operation checks whether the right end of the deque is still at k (by rereading A[k−1] and A[k]), and if so, the deque is full. If not, or if the nextnext entry is either an RN or DN entry, then some other operation is concurrent with the rightpush( ), and the rightpush( ) operation retries.

Assuming the invariants above, it is easy to see that this new algorithm is linearizable in exactly the same way as the algorithm in the previous section, except that a rightpush( ) operation that returns "full" linearizes at the point that next-next is read (line RH11). Because we subsequently confirm (line RH13) that A[k−1] and A[k] have not changed since they were last read, we know the deque extends from A[k+2] to A[k−] (with A[k−1] as its rightmost value), so that A[k] and A[k+1] are the only nonnull entries, and thus, the deque is full.

The main difficulty is verifying that when a rightpush( ) actually pushes the new value onto the deque (line RH5), either the next entry is an RN entry, or it is a DN entry and the nextnext entry is an LN entry. This is to ensure that after the push, there are still at least two null entries, one of which is an RN or DN entry. One key to the proof is to note that the value of an entry is changed only by lines RO8, RH5, RH9, RH17, RP5, and their counterparts in the left-side operations. Furthermore, these lines only change an entry if the entry has not changed since it was most recently read. These lines are annotated with a description of how they change the value of the entry.

Time Complexity.

A simple measure of the time complexity of an obstruction-free algorithm (without regard to the particular contention manager and system assumptions) is the worst-case number of steps that an operation must take in isolation in order to be guaranteed to complete. For our algorithms, this is a constant plus the obstruction-free time complexity of the particular oracle implementation used.

Obstruction-Free Atomic Multi-Target Transactions

We next describe a technique for implementing obstruction-free atomic multi-target transactions that target special "transactional" locations in shared memory. As before, we build upon separation (or separability) of an obstruction-free implementation of concurrent object or mechanism semantics from a contention management mechanism. In general, the programming interface for using operations based on these transactions can be structured in several ways, including as n-word compare-and-swap (NCAS) operations or as atomic sequences of single-word loads and stores (e.g., as transactional memory).

We have developed a software-based technique for implementing multi-target atomic operations on an arbitrary number of non-contiguous memory locations using synchronization facilities available on many standard architectures. Such operations can be presented to the programmer in a variety of application programming interfaces (APIs), or simply employed (e.g., ad hoc) without definition of a standardized interface. Since the APIs tend to provide a useful descriptive context for illustrating our techniques, the description that follows assumes an API, though without limitation. One alternative API takes the form of two atomic operations: an atomic n-target compare-and-swap (NCAS) operation and an atomic load operation. The NCAS operation takes a sequence of n addresses, $a_1, \ldots a_n$, a sequence of n old values, $x_1, \ldots x_n$, and a sequence of n new values, $y_1, \ldots y_n$. If the operation returns true, then for each i, $1 \leq n$, the value at location $a_i$ is equal to $x_i$, and the value at $a_i$ is set to $y_i$. If the operation returns false, then no memory location is changed. We say a transaction (or NCAS) succeeds if it returns true, and fails if it returns false. The load operation simply takes an address and returns the value at that address.

An alternative API is a transaction: a sequence of single-target loads and stores that appear to take effect atomically with respect to other transactions. The programmer begins a transaction, executes a sequence of single-target loads and stores on behalf of that transaction, and then attempts to commit the transaction. If the commit succeeds, then none of that transaction's loads or stores appear to be interleaved with the loads and stores of other transactions. If the commit fails, then none of that transaction's stores will be visible to other transactions.

The proposed implementation is obstruction-free, meaning that if a thread t executes a transaction (or NCAS) and, at some point, t runs without interruption for long enough, then that transaction (or NCAS) will complete. The load operation is wait-free: it will return a value as long as the calling thread runs long enough (with or without interruption). The proposed implementation is also linearizable, implying that each transaction (or NCAS) appears to take effect instantaneously at some point between its invocation and response. For clarity of description, we focus on the NCAS implementation. Transforming this implementation to the transactional memory API is straightforward, and is discussed below.

Overview

We now describe our basic technique(s) in the context of a multitarget compare and swap (NCAS) operation. Each transactional location may be "acquired" by an NCAS operation that wants to access it. In this case, we say that the NCAS operation owns the location. At most one NCAS operation may own a location at any time. Thus, concurrent NCAS operations that want to access the same location must compete for ownership of that location. In addition to a value, a transactional location contains a pointer (or other suitable reference) to its owner, if any.

In an illustrative embodiment, each NCAS operation maintains a data structure called a transaction descriptor.

```
typedef struct trans_s {
    status_t status;
    int size;              // size > 0
    value_t[ ] newvals;    // should have size elements
} trans_t;
```

The size field indicates the number of memory locations affected by the NCAS, and the newvals field is an array of size values that will replace the current values if the NCAS succeeds. The status field of a transaction descriptor indicates whether the current NCAS operation, if any, is on track to succeed.

typedef enum{ACTIVE, SUCCESS, FAIL, LOST}status_t;

Transactional locations can be represented as follows:

```
typedef struct loc_s {   // Should be atomically CAS-able
    value_t val;
    bool held;
    trans_t *trans;
    int argno;
} loc_t;
```

The val field encodes the value of the transactional location (or in some exploitations, a reference to a location that encodes the value of the transactional location). The held field encodes a Boolean status of the transactional location. A transactional location is held if owned by an NCAS operation. The pointer trans identifies the NCAS operation (by transaction descriptor), if any, that owns the transactional location. Finally, the field argno identifies the particular argument, $0 \leq \text{argno} < N$, where N is the size of the owning NCAS operation.

Figure 9:
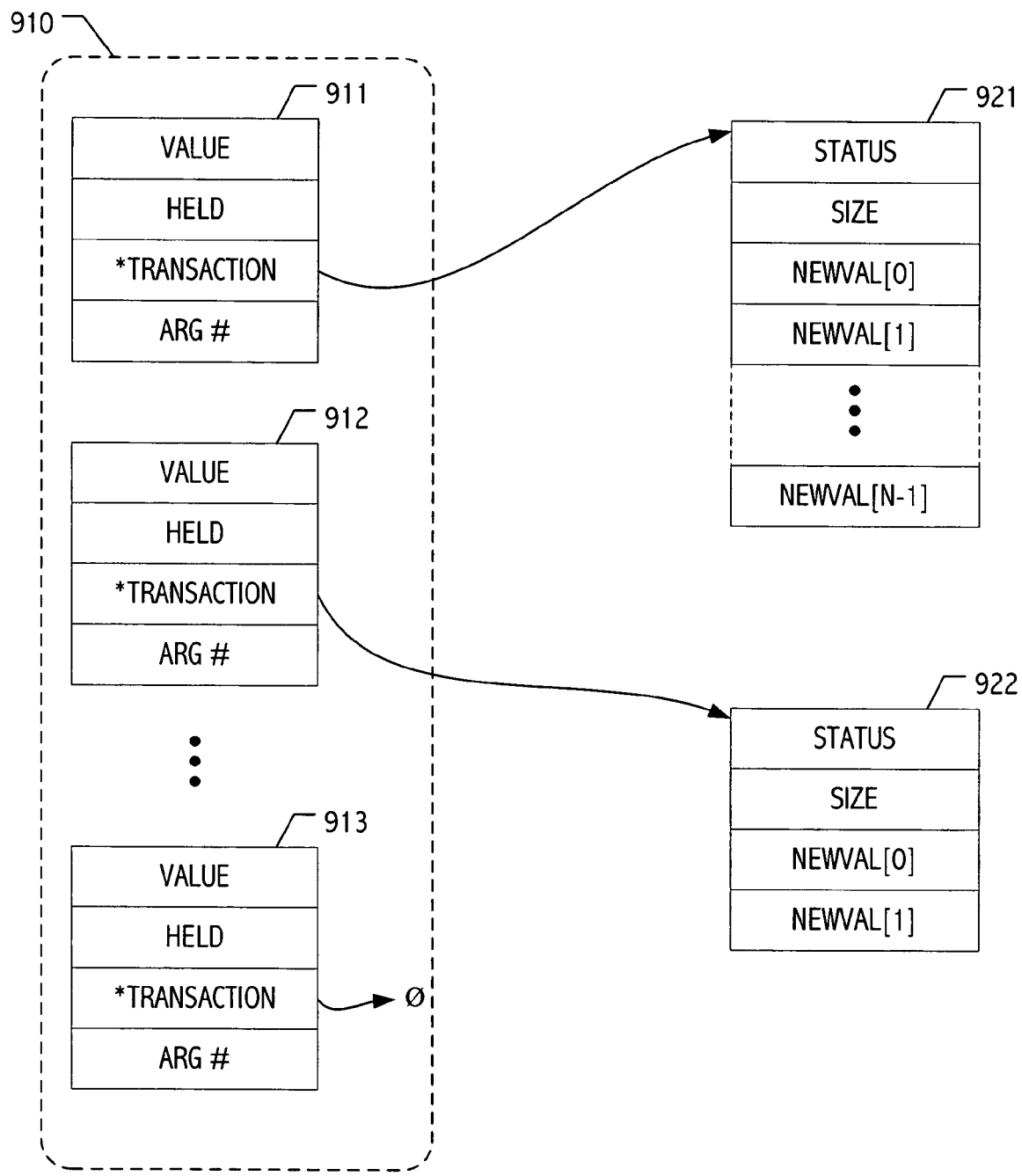
FIG. 9 depicts relationships between encodings of transactional locations and transaction descriptors in accordance with some obstruction-free atomic multi-target transaction embodiments of the present invention.

FIG. 9 illustrates relationships between encodings of transaction descriptors and various transactional locations in accordance with some embodiments of the present inventions. In particular, two active transactions corresponding to transaction descriptors 921 and 922 are illustrated. The first active transaction (see transaction descriptor 921) corresponds to an N-way CAS, while the second active transaction (see transaction descriptor 922) corresponds to a 2-way CAS (or DCAS). The first transaction targets N transactional locations 910 and owns at least one of the transactional locations, namely transactional location 911. One of the transactional locations targeted by the first transaction, namely transactional location 912, is owned by the second transaction, which corresponds to transaction descriptor 922. Transactional location 913 is unowned.

To successfully complete, the first active transaction will need to acquire ownership of transaction location 912 in addition to each of the other transactional locations it targets. Coordination amongst competing transactions will be understood in light of the description that follows.

Figure 10:
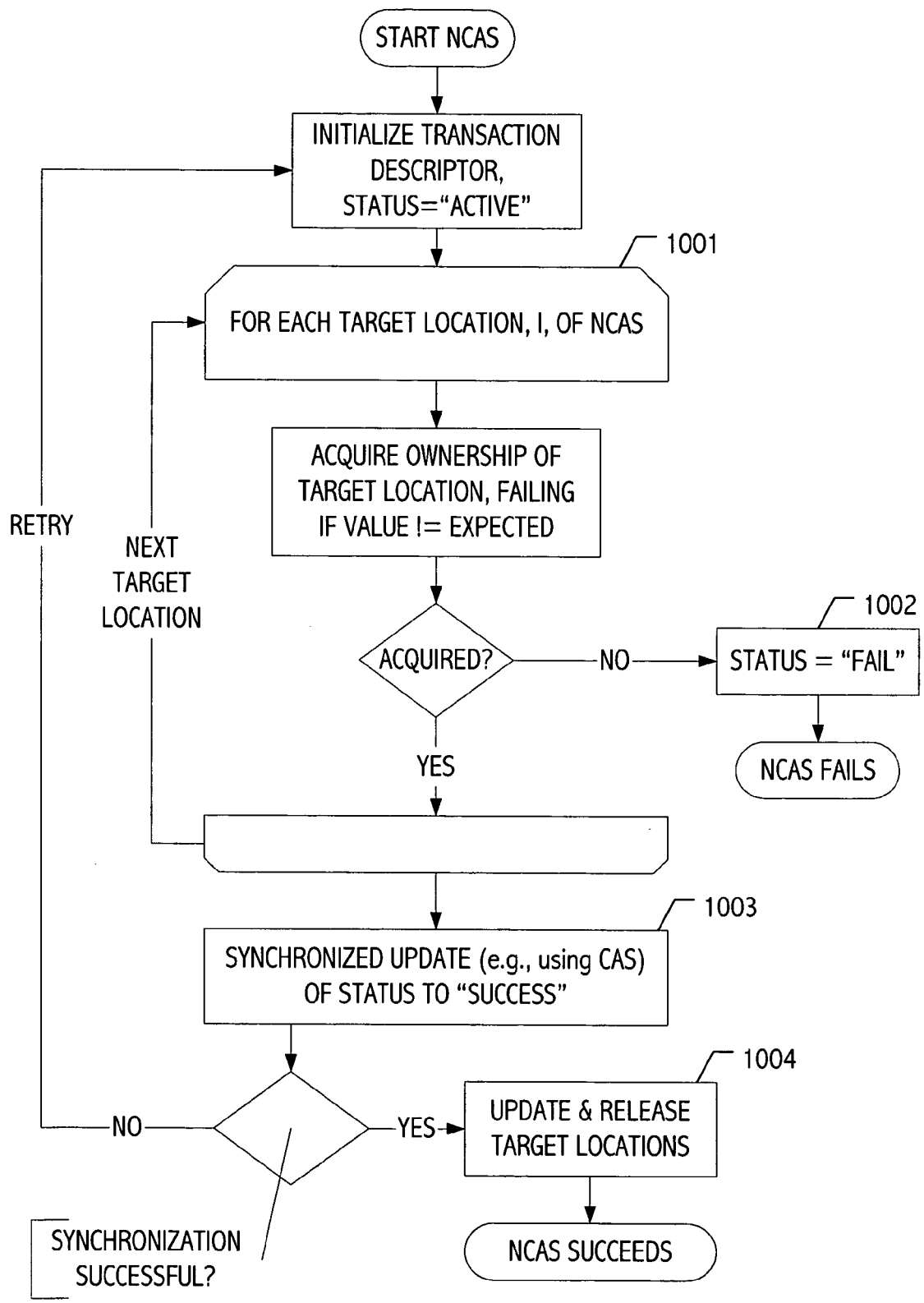
FIG. 10 is a flow diagram that highlights major flows in execution of a multitarget compare and swap (NCAS) operation in accordance with some embodiments of the present invention.

FIG. 10 illustrates major flows in execution of a multitarget compare and swap (NCAS) operation in accordance with some embodiments of the present invention. Initially, the status of a NCAS operation is ACTIVE. An NCAS operation first attempts (loop 1001) to acquire all the locations it wishes to update. If it determines that the current value of any of them is not equal to the expected value passed to the NCAS operation, then it fails (1002) and returns false. Otherwise, once the NCAS operation has acquired all the specified locations, it attempts to change (1003) its status from ACTIVE to SUCCESS. To properly synchronize with a concurrent operation that may be seeking to wrest ownership of a targeted location, the status update employs an appropriate synchronization primitive, e.g., a compare and swap (CAS) operation, a load-linked, store-conditional operation pair, etc. If the transaction succeeds in changing its status, then it writes back the new values and releases (1004) the transactional locations.

The instant at which a transaction's status field is changed to SUCCESS is the linearization point of a successful NCAS operation: the abstract values of all locations owned by that operation are changed atomically from the value stored in the locations to the new values stored in the transaction descriptor of the operation. The abstract value of a location changes only at the linearization point of a successful NCAS operation that targets the location.

Figure 11:
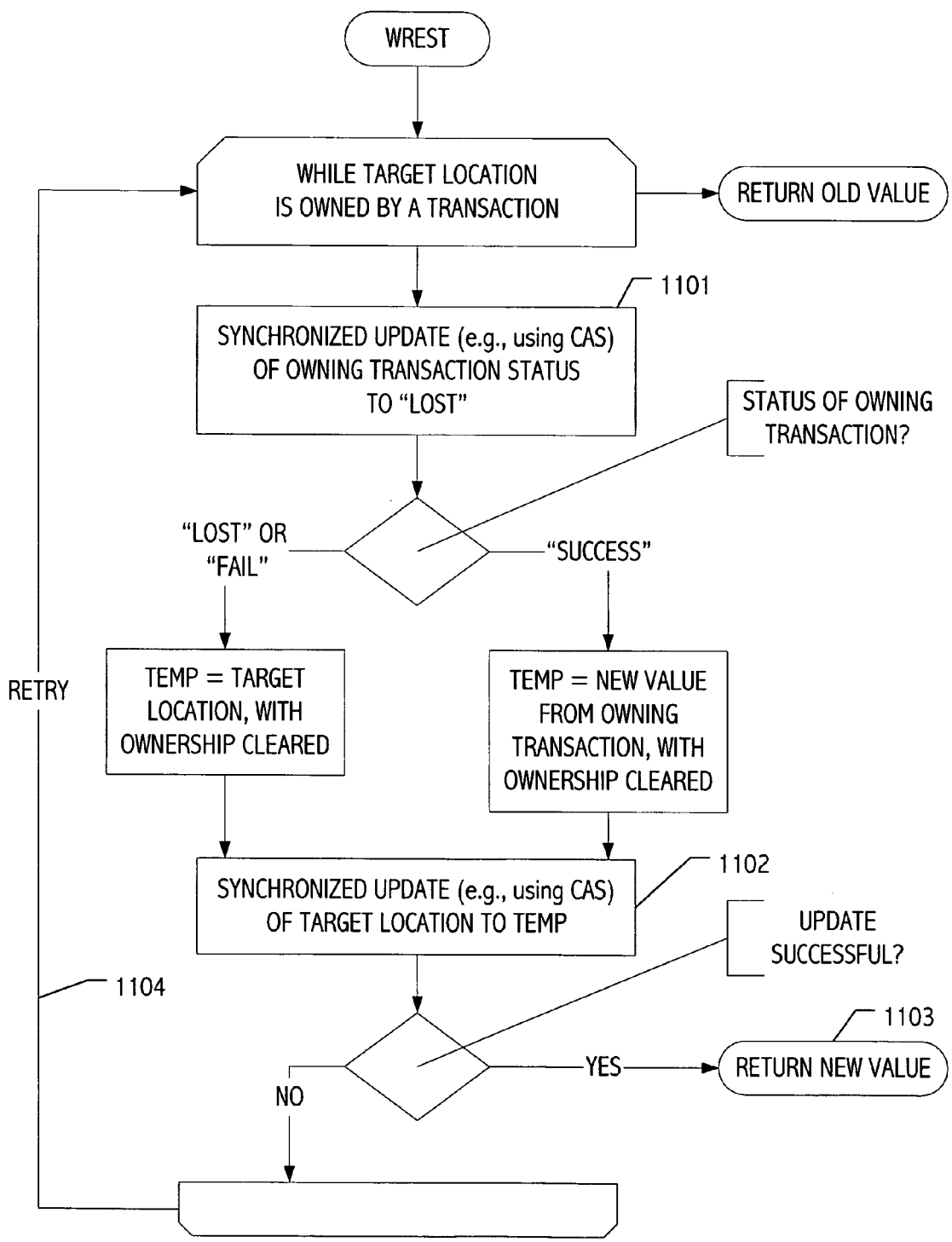
FIG. 11 is a flow diagram that highlights major flows in execution of an illustrative ownership wresting sequence employed by a multi-target compare and swap (NCAS) operation in an attempt to acquire ownership of a target location thereof.

An NCAS operation $c_1$ attempting to acquire a location that is owned by another NCAS operation $c_2$ must "wrest" ownership from $c_2$ in order to continue. FIG. 11 illustrates major flows in execution of an illustrative ownership wresting sequence employed by a multitarget compare and swap (NCAS) operation in an attempt to acquire ownership of a target location thereof. Operation $c_1$ wrests ownership using an appropriate synchronization primitive, e.g., a compare and swap (CAS) operation, a load-linked, store-conditional operation pair, etc., (1101) to change the status field of $c_2$ from ACTIVE to LOST. When $c_2$ attempts to complete the operation, it will fail, and must retry.

Assuming the synchronization primitive was successful (or that NCAS operation $c_2$ failed for some other reason), we attempt to update the transactional location to reflect an unowned status, i.e., held=false. If the synchronization primitive was unsuccessful because the owning transaction was able to complete (updating it's status to SUCCESS), a new value for the transactional location, which is stored in the owning transaction's descriptor, is used to update the value of the transactional location. In either case, we attempt to update the transactional location to reflect an unowned status, i.e., held=false. A synchronization primitive, e.g., a compare and swap (CAS) operation, a load-linked, store-conditional operation pair, etc., (1102) is employed to mediate the attempt. If successful, the transactional location value is returned (1103). If not, we retry (1104).

Exemplary NCAS Implementation

While the preceding description highlights certain aspects of an exemplary implementation of an NCAS operation, certain flows, conditions, behaviors, etc. are omitted for clarity of description. Accordingly, some of the omitted aspects will be better understood by persons of ordinary skill in the art based on review of the pseudocode that follows. In particular, certain details of ownership acquisition may be better understood with reference to the exemplary code.

The following code is merely illustrative, and based on the description herein persons of ordinary skill in the art will appreciate a wide range of suitable variations. Turning first to an NCAS operation:

```
bool NCAS(int n, (loc_t *)[ ] args, value_t[ ] evs,
         value_t[ ] nvs) {
// Assumes n>0, and args[0..n-1], evs[0..n-1] and
// nvs[0..n-1] are defined. *args[0]..*args[n-1] are
// Tlocs to be accessed (read and modified).
// evs[i] is the value we "expect" to find in args[i]->val
// nvs[i] is the value written into args[i]->val if the
// NCAS succeeds, args, evs and nvs are assumed to be
// local (not modified by other threads).
// They are not modified by this operation.
// Also assumes that args[i] != args[j] if i != j.
while (true) {
    /* Set up transaction descriptor */
    trans_t *t = new trans_t(n);      // transaction descriptor
                                       // for this NCAS
    t->status = ACTIVE;    // changes only once (to SUCCESS or
                           // LOST)
    t->size = n;    // size and newvals never change
                    // (after init)
    for (int i = 0; i < n; i++)
        t->newvals[i] = nvs[i];    // Can avoid copying (and
                                    // allocating space for
                                    // newvals) if nvs will not
                                    // be recycled prematurely.
    if (!AcquireAll(n, args, evs, t)) {
        t->status = FAIL;
        return false;
    }
    CAS(&t->status, ACTIVE, SUCCESS);
    for (int i = 0; i < n; i++)
        Release(args[i], t);
    if (t->status == SUCCESS)
        return true;
    else                           // t->status == LOST
        t->status = ACTIVE;        // try again
} // end while (true)
}
```

The locations, *args[0] . . . *args[n−1], are transactional locations to be accessed (read and modified) by the NCAS operation. A value evs[i] is the value we "expect" to find in the value field of a corresponding transactional location, i.e., in args[i]→val, and nvs[i] is the value written into args[i]→val if the NCAS operation succeeds. Storage for the parameters args, evs and nvs is assumed to be local (i.e., not modified by other threads).

The NCAS operation employs a sequence of operations to acquire ownership of all targeted transactional locations, while also ascertaining that value of each such targeted transactional locations is as expected. By commingling the ownership acquisition and expected value checks, the illustrated implementation attempts to avoid unnecessary work. Pseudocode for three nested procedures AcquireAll, Acquire and Wrest employed by the NCAS operation follow:

```
bool AcquireAll(int n, (loc_t *)[ ] args, value_t[ ] evs,
                trans_t *t) {
// Assumes n > 0, and args[0..n-1] and evs[0..n-1] are
// defined. *args[0]..*args[n-1] are Tlocs to be accessed
// (read and modified). evs[i] is the (abstract) value we
// "expect" to find in *args[i]. args and evs are assumed
// to be local and are not modified.
// If AcquireAll returns true, then each *args[i] was
// <evs[i],true,t,i> at some time during the execution of
// this procedure. (May be different times for different
// i's.) If AcquireAll returns false, then for some i, the
// abstract value of *args[i] is not evs[i] at some time
// during the execution of this procedure.
```

```
// May "wrest" ownership of *args[i], aborting active NCAS
// operations.
for (int i = 0; i < n; i++) {
    if ( !Acquire(args[i],evs[i],t,i) ) {
        for ((int j = 0; j <= i; j++)
            Release(arg[j], t);    // (Optional--helps other
                                   // threads)
        return false;
    }
}
return true;
} // end AcquireAll
```

As before, locations *args[0] . . . *args[n−1] are transactional locations to be accessed (read and modified) by the NCAS operation. Value evs[i] is the (abstract) value we "expect" to find in *args[i]. Storage for args and evs are assumed to be local and are not modified.

If AcquireAll returns true, then each *args[i] had a value <evs[i], true, t, i> at some time during the execution of the procedure. That is, each targeted transactional location encoded the expected value and was held (i.e., owned) by the current NCAS operation (transaction=t). Of course, the times may be different for different i's. If AcquireAll returns false, then for some i, the abstract value of *args[i] is not evs[i] at some time during the execution of this procedure. AcquireAll invokes Acquire to check expected value and, if appropriate, acquire ownership for an individual transactional location. Exemplary code for the Acquire procedure follows:

```
bool Acquire((loc_t *) arg, value_t ev, trans_t *t, int i) {
    // If Acquire returns true, *arg was <ev,true,t,i>
    // at some point during the execution of this procedure.
    // If Acquire returns false, arg->val != ev at some point
    // during the execution of this procedure.
    // May "wrest" ownership of *arg, aborting active NCAS
    // operations.
    loc_t old;
    while ((old = *arg) != <ev,true,t,i> ) {    // not already
                                                 // acquired
        if (old.held)
            old = Wrest(arg);
        if (old.val != ev)
            return false;
        if CAS(arg, old, <ev,true,t,i>) break;
    }
    return true;
} // end Acquire
```

If a transactional location to be acquired by the NCAS operation is currently held by another transaction, the Acquire procedure invokes Wrest to make the location unowned, aborting (if necessary) an active competing transaction. The following code is exemplary:

```
loc_t Wrest (loc_t *arg) {
    // Makes the location unowned, if it isn't already.
    // Does not change the abstract value of the location.
    // Returns the new contents of *arg.
    loc_t old, newv;
    while ((old = *arg).held ) {
        if (old.trans->status == ACTIVE) {
            // Opportunity for backoff, in which case we should
            // reread status
            CAS(&old.trans->status, ACTIVE, LOST);
        }
        if (old.trans->status == SUCCESS)
            newv = <old.trans->newvals[old.argno],false,NULL,0>;
        else // old.trans->status == LOST or FAIL
            newv = <old.val,false,NULL,0>;
```

```
        if CAS(arg, old, newv)
            return newv;
    }
    return old;
} // end Wrest
```

A Release operation is also employed by the NCAS implementation to perform the appropriate value update and ownership clearing on successful completion of an NCAS operation. In addition, the release facility may be optionally employed even by a failing NCAS operation to clear ownership of acquired transactional locations. Exemplary code for a Release operation follow:

```
void Release((loc_t *) arg, trans_t *t) {
    // Assumes t->status != ACTIVE
    // Sets *arg to <--,false,NULL,0> if arg->trans == t
    // (-- is abstract value)
    if ((old = *arg).trans == t) {
        if (t->status == SUCCESS)
            newv = <t->newvals[old.argno],false,NULL,0>;
        else
            newv = <old.val,false,NULL,0>;
        CAS(arg, old, newv)
    }
} // end Release
```

Finally, while we have focused on description of an NCAS operation, persons of ordinary skill in the art will appreciate that applications will typically need to load values from transactional locations as well. Because the value of a transactional location may reside in the transactional location or with an owning transaction, implementation in accordance with the following pseudocode may be employed to obtain the appropriate version.

```
value_t trans_Load( loc_t *1 ) {
    loc_t tloc = *1;
    if (!tloc.held)
        return tloc.val;
    if (tloc.trans->status    !=    SUCCESS)
        return tloc.val;
    return tloc.trans->newvals[tloc.argno];
}
```

The trans_Load operation simply reads the location and, if the location is unowned, returns the value stored there. If the location is owned, then the operation reads the status of the owner. If the owner has successfully completed, then the load returns the value stored in the corresponding entry of the array of new values stored in the owner's transaction descriptor. Otherwise, the trans_Load returns the value it read in the location.

Correctness

To see that the operations are correctly implemented, we show that a trans_Load operation returns a value that was the abstract value of the location at some time during its execution (and does not change the abstract value of the location), that for a successful NCAS operation, there is a time during its execution that the abstract values of all the locations matched the expected values passed into the NCAS operation and were atomically updated to the new values passed into the operation, and that for a failed NCAS operation, some location specified by the operation did not have the expected value at some time during its execution.

To see this, recall that the abstract value of a location is determined by the contents of the location and by the contents of the descriptor of the owning transaction, if any. Specifically, the abstract value of an unowned transactional location is the value stored in that location. The abstract value of an owned transactional location depends on the status of the owner: If the owner has not succeeded, the abstract value of the location is still the value stored in that location. If the owner has succeeded, the abstract value is the value stored in the corresponding entry of the array of new values stored in the owner's transaction descriptor.

The key to the correctness argument is that when an NCAS operation changes its status from ACTIVE to SUCCESS—this point is the serialization point of a successful NCAS operation—it still owns all the locations it acquired. This property is guaranteed because an operation that owns a location only loses ownership (without releasing the location) when the location is wrested by another operation. In this case, the other operation must first change the first operation's status to LOST Thus, the first operation's attempt to change its status from ACTIVE to SUCCESS will fail, and the operation must retry. It is also important to note that, once an operation has succeeded, its status will be SUCCESS thereafter.

A failed NCAS operation is serialized at the point that it reads (inside the Acquire procedure) a location whose value is not the expected value passed into the operation. The value stored in the location is the abstract value of the location because Acquire ensures that the location is unowned before checking its value against the expected value.

A load that finds a location unowned, or finds that the owner has not yet succeeded, is serialized at the point that it read the location. (The owner, if any, had not yet succeeded at this point, if it has not succeeded when the load checks its status.) If the location is owned by an NCAS operation that has succeeded at the time the load operation checks its status, then the load is serialized at the later of the time that it read the location and the time (immediately after) the owner changed its status to SUCCESS. This instant always occurs during the execution of the load operation (after it read the location and before it read the status of the owner), and the value returned is the abstract value at that time because, by the key correctness property above, an NCAS operation that changes its status to SUCCESS owns all the locations it acquired (including the location being loaded) at the time that it updates its status.

The load operation is clearly wait-free, as it has no loops. Informally, it is easy to see that the NCAS operation is obstruction-free because once an operation runs alone, eventually either it will find a location that does not have the expected value, in which case it will fail, or it will wrest all its desired locations from other operations that may own them, find that they all have the expected values, and succeed in changing its status to SUCCESS. Verifying this rigorously is a straightforward task: every while loop completes in at most one full iteration if it is executed in isolation.

Note that two threads attempting to NCAS the same location may indefinitely cause each other to retry, even if they both expect the correct value, which never changes during the execution of their NCAS operations. This can occur only if each wrests the location from the other before the other is able to successfully complete; for this to happen, both threads must take steps. As a practical matter, such conflicts can be avoided by standard means such as exponential back-off or queuing.

Memory Management

The only data structures allocated here are transaction descriptors: each transaction gets a new transaction descriptor. These transaction descriptors can be recycled using non-blocking memory management techniques such as described in commonly owned, co-pending U.S. patent application Ser. No. 10/340,156, filed Jan. 10, 2003, naming Mark S. Moir, Victor Luchangco and Maurice Herlihy as inventors.

Extensions to Larger Transactional Locations

For convenience, we have thus far presented our techniques assuming that a memory location sufficient to contain a loc_t record can be atomically accessed by load and CAS instructions. If this is not the case, several alternative implementations are possible consistent with the techniques we have described.

For example, we may employ an additional level of indirection so that, rather than using a CAS instruction to modify loc_t records, we instead use a CAS instruction to modify pointers to buffers that are large enough to contain loc_t records. It is safe to reuse one of these buffers only after it has been determined that no thread will subsequently read from the buffer before it is reused. Such determination can be made by standard garbage collectors, or by nonblocking memory management techniques such as those described in commonly owned, co-pending U.S. patent application Ser. No. 10/340,156, filed Jan. 10, 2003 and naming Mark S. Moir, Victor Luchangco and Maurice Herlihy as inventors, the entirety of which in incorporated herein by reference. Given this arrangement, and because the buffers are not modified after they are initialized and before they are reused, we can consider the load of a pointer to a buffer as an atomic load of the contents of that buffer, and our implementation works as described previously.

Another option is to relax the requirement that a location contains the old value of the location while that location is owned by a transaction. This way, at any point in time, each location contains either its value (if the location is not currently owned) or a reference to the owning transaction descriptor. In this case, to facilitate the wresting of ownership by one transaction from another, a transaction that acquires ownership of the location first stores the value that will be displaced by that acquisition somewhere that it can be found by the wresting transaction; a natural place to store the displaced value is in the transaction descriptor. This approach assumes that there is some effective method for distinguishing application values from references to transaction descriptors. This can be achieved for example by "stealing a bit" from application pointers, using well-known techniques for aligned allocation so that the least significant bit of every pointer is zero. Another possibility exists if the application values are known to be pointers returned to the application by a memory allocator. In this case, because the memory allocator will not return to the application a pointer to a transaction descriptor already allocated by the NCAS or transactional memory implementation, we can distinguish application values from references to transaction descriptors by keeping track of the addresses of all transaction descriptors. This can be made efficient by allocating all transaction descriptors in a single block, so that distinguishing them from application values is merely an address range comparison.

In the case that we "displace" application values into transaction descriptors when acquiring ownership, it is more difficult to provide a wait-free load operation because we may have to repeatedly "chase" the displaced value from one transaction to another. However, it is still straightforward to provide an obstruction-free load operation because this chasing will occur only in the presence of contention with concurrent transactions.

Transactional Memory Variations

It is straightforward to convert the illustrated NCAS implementation to a transactional memory implementation. As before, each transaction must acquire a location before loading from that address or storing to it. Instead of keeping a fixed-size newval field in the transaction descriptor, the transaction can keep a table of new values indexed by address. When a location is acquired, the transaction copies the address and its current value into the table. To load from that address, the transaction returns the corresponding value from the table. To store to that address, the transaction modifies the corresponding value from the table. To commit a transaction, the transaction moves the value from the table to the memory location, and resets the held and trans field as before. One transaction wrests a value from another as before.

The principal difference between the transactional memory API and the NCAS API is that the number of locations affected by a transaction need not be declared in advance. Earlier work in the area of software transactional memory required that a transaction predeclare the memory locations it would update in order to ensure that some transaction always made progress. The obstruction-free property, however, does not make such strong guarantees, so the programmer is free to choose memory locations on the fly.

Contention Management Strategies

Despite our advocacy of obstruction-free synchronization, we do not expect progress to take care of itself. On the contrary, we have found that explicit measures are often necessary to avoid starvation. Obstruction-free synchronization encourages a clean distinction between the obstruction-free mechanisms that ensure correctness (such as conflict detection and recovery) and additional mechanisms that ensure progress (such as adaptive backoff or queuing).

In our multitarget transaction implementation, progress is the responsibility of a contention manager, which may be separate from, or modular with respect to the transaction implementation itself. Each thread has its own contention manager instance, which it consults to decide whether to force a conflicting thread to abort. In addition, contention managers of different threads may consult one another to compare priorities and other attributes.

The correctness requirement for contention managers is simple and quite weak. Informally, any active transaction that asks sufficiently many times must eventually get permission to abort a conflicting transaction. More precisely, every call to a contention manager method eventually returns (unless the invoking thread stops taking steps for some reason), and every transaction that repeatedly requests to abort another transaction is eventually granted permission to do so. This requirement is needed to preserve obstruction-freedom: A transaction T that is forever denied permission to abort a conflicting transaction will never commit even if it runs by itself. If the conflicting transaction is also continually requesting permission to abort T, and incorrectly being denied this permission, the situation is akin to deadlock. Conversely, if T is eventually allowed to abort any conflicting transaction, then T will eventually commit if it runs by itself for long enough.

The correctness requirement for contention managers does not guarantee progress in the presence of conflicts. Whether a particular contention manager should provide such a guarantee—and under what assumptions and system models it should do so—is a policy decision that may depend on applications, environments, and other factors. The problem of avoiding livelock is thus delegated to the contention manager. The Wrest operation, detailed above, illustrates one suitable opportunity for contention management by backoff or other contention management technique.

Other Embodiments

While the invention(s) is(are) described with reference to various implementations and exploitations (including the dynamic software transactional memory, obstruction-free data structure and multiple-target transaction and NCAS implementations detailed above), it will be understood that these embodiments are illustrative and that the scope of the invention(s) is not limited to them. Terms such as always, never, all, none, etc. are used herein to describe sets of consistent states presented by a given computational system, particularly in the context of correctness proofs. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Many variations, modifications, additions, and improvements are possible. For example, while application to particular concurrent shared objects and particular implementations thereof have been described in detail herein, applications to other shared objects and other implementations will also be appreciated by persons of ordinary skill in the art. In addition, more complex shared object structures may be defined, which exploit the techniques described herein. While much of description herein has focused on compare and swap (CAS) based synchronization, other synchronization primitives may be employed. For example, based on the description herein, persons of ordinary skill in the art will appreciate that other suitable constructs, including load-linked and store-conditional operation pairs (LL/SC) may be employed, as well. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s).

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of operating a computing machine, the method comprising:
    creating an instance of a data structure defined using one or more programming language constructs, wherein the data structure instance includes at least one transactional location for which ownership is mediated through use of a single-target synchronization primitive;
    storing the contents of the data structure instance in a shared memory that is accessible to a plurality of concurrently executing computations;

introducing a retry construct into a flow executable to wrest ownership of the transactional location from a current owner;

executing a computation that, when executed on one or more processors that access the memory, performs concurrent obstruction-free access operations on the data structure instance, wherein the obstruction-free access operations appear to execute in a one-at-a-time order and are non-blocking, but do not themselves ensure progress of the computation in the presence of contention, wherein said executing comprises: detecting contention between one of the obstruction-free access operations performed by the computation and another access operation performed on the data structure instance; and in response to said detecting, invoking a given contention management mechanism that is separate from the computation and that is configured to facilitate progress of the computation given the contention;

replacing the given contention management mechanism with a substitute contention management mechanism during a course of the computation that employs the obstruction-free access operations; and subsequent to said replacing, invoking the substitute contention management mechanism, rather than the given contention management mechanism, in response to detecting contention between a subsequent one of the obstruction-free access operations performed by the computation and another access operation performed on the data structure instance.

2. The method of claim 1, further comprising:
the retry construct employing a temporal backoff and a rereading of status of the transactional location, wherein the temporal backoff comprises waiting for some time before said rereading.

3. The method of claim 1, further comprising:
the retry construct awaiting, with eventual pre-emption, completion of the current owner's operation on the transactional location.

4. A method of operating a computing machine, the method comprising:

creating an instance of a data structure defined using one or more programming language constructs;

storing the contents of the data structure instance in a shared memory that is accessible to a plurality of concurrently executing computations;

executing a computation that, when executed on one or more processors that access the memory, performs concurrent obstruction-free access operations on the data structure instance, wherein the obstruction-free access operations appear to execute in a one-at-a-time order and are non-blocking, but do not themselves ensure progress of the computation in the presence of contention, wherein said executing comprises: detecting contention between one of the obstruction-free access operations performed by the computation and another access operation performed on the data structure instance; and in response to said detecting, invoking a given contention management mechanism that is separate from the computation and that is configured to facilitate progress of the computation given the contention;

replacing the given contention management mechanism with a substitute contention management mechanism during a course of the computation that employs the obstruction-free access operations; and subsequent to said replacing, invoking the substitute contention management mechanism, rather than the given contention management mechanism, in response to detecting contention between a subsequent one of the obstruction-free access operations performed by the computation and another access operation performed on the data structure instance; and wherein the data structure instance implements a deque, further comprising: introducing a backoff, priority or queuing construct, with timeout, into retry flows of push and pop operations on the deque.

5. A computer readable storage medium, comprising program instructions computer-executable to implement:

creating an instance of a data structure defined using one or more programming language constructs;

storing the contents of the data structure instance in a shared memory that is accessible to a plurality of concurrently executing computations;

executing a computation that, when executed on one or more processors that access the memory, performs concurrent obstruction-free access operations on the data structure instance, wherein the obstruction-free access operations appear to execute in a one-at-a-time order and are non-blocking, but do not themselves ensure progress of the computation in the presence of contention, wherein said executing comprises: detecting contention between one of the obstruction-free access operations performed by the computation and another access operation performed on the data structure instance; and in response to said detecting, invoking a given contention management mechanism that is separate from the computation and that is configured to facilitate progress of the computation given the contention, wherein the contention management mechanism is configured as a plug-in module to a defined programming interface;

replacing the given contention management mechanism with a substitute contention management mechanism during a course of the computation that employs the obstruction-free access operations; and subsequent to said replacing, invoking the substitute contention management mechanism, rather than the given contention management mechanism, in response to detecting contention between a subsequent one of the obstruction-free access operations performed by the computation and another access operation performed on the data structure instance.

6. A non-transitory, computer readable storage medium comprising program instructions computer-executable to implement:

a single obstruction-free implementation of a concurrent data structure defined using one or more programming language constructs comprising a functional encoding of state modifying operations that are configured to operate on instances of the data structure, that appear to execute in a one-at-a-time order, and that are non-blocking, but which do not themselves ensure progress in the presence of contention, wherein respective instances of the data structure are executable, without change to semantics of the obstruction-free access operations, in at least two distinct computing environments using two different contention management mechanisms adapted to facilitate progress of computations that employ the obstruction-free access operations to operate on the respective data structure instances when executed in the distinct computing environments, wherein the two different contention management mechanisms are separable from and independent of the respective data structure instances and are invoked in response to detecting contention between one of the state modifying operations performed on the respective data structure instances by one of the computations and another state modifying operation performed on the respective data structure instances, and wherein each of the two different contention management mechanisms implements instances of the methods specified in a common contention management interface definition for coordination between the obstruction-free access operations and the contention management mechanism, and wherein the common contention management interface comprises at least one feedback method.

7. The computer-readable storage medium of claim 6,
wherein a first of the at least two distinct computing environments is a multiprocessor computing environment; and
wherein a second of the at least two distinct computing environments is a uniprocessor computing environment for which the respective contention management mechanism relies upon quantum scheduling of the uniprocessor computing environment.

* * * * *

UNITED STATES PATENT AND TRADEMARK OFFICE
CERTIFICATE OF CORRECTION

PATENT NO. : 9,052,944 B2  
APPLICATION NO. : 11/106790  
DATED : June 9, 2015  
INVENTOR(S) : Moir et al.

Page 1 of 1

It is certified that error appears in the above-identified patent and that said Letters Patent is hereby corrected as shown below:

In the Specification

In column 2, line 46, delete "modem" and insert -- modern --, therefor.

In column 12, line 55, delete "tmobject" and insert -- tmObject --, therefor.

In column 20, line 47, delete "success fully," and insert -- successfully, --, therefor.

In column 22, line 44, delete "Based" and insert -- Basic --, therefor.

In column 23, line 9, after "the" insert -- first --.

In column 39, line 42, delete "though" and insert -- through --, therefor.

In column 43, line 23, delete "V$_2$," and insert -- v$_2$, --, therefor.

In column 48, line 58, delete "A[k-]" and insert -- A[k-1] --, therefor.

In column 48, line 67, delete "R08," and insert -- RO8, --, therefor.

Signed and Sealed this  
Twelfth Day of July, 2016

Michelle K. Lee  
*Director of the United States Patent and Trademark Office*